(12) United States Patent
Kim et al.

(10) Patent No.: US 7,287,858 B2
(45) Date of Patent: Oct. 30, 2007

(54) COLOR SEPARATING UNIT AND PROJECTION TYPE IMAGE DISPLAY APPARATUS EMPLOYING THE SAME

(75) Inventors: Dae-sik Kim, Suwon-si (KR); Kun-ho Cho, Suwon-si (KR); Sung-ha Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 349 days.

(21) Appl. No.: 10/794,401

(22) Filed: Mar. 8, 2004

(65) Prior Publication Data

US 2004/0233342 A1 Nov. 25, 2004

Related U.S. Application Data

(60) Provisional application No. 60/464,092, filed on Apr. 21, 2003.

(30) Foreign Application Priority Data

| Mar. 6, 2003 | (KR) | 10-2003-0014152 |
| Jun. 27, 2003 | (KR) | 10-2003-0042770 |

(51) Int. Cl.
*G03B 21/14* (2006.01)
*G02B 27/14* (2006.01)

(52) U.S. Cl. .................... 353/20; 353/34; 353/31; 349/9; 348/743; 359/634

(58) Field of Classification Search ............ 353/20, 353/31, 33, 34, 37; 349/5, 7, 8, 9; 348/742, 348/743; 359/462, 464, 465, 629, 634
See application file for complete search history.

(56) References Cited

U.S. PATENT DOCUMENTS

| 4,170,401 | A | 10/1979 | Yoder, Jr. et al. |
| 5,612,753 | A | 3/1997 | Poradish et al. |
| 5,863,125 | A | 1/1999 | Doany |
| 6,273,567 | B1* | 8/2001 | Conner et al. ............... 353/20 |
| 6,288,815 | B1 | 9/2001 | Lambert |
| 6,327,093 | B1* | 12/2001 | Nakanishi et al. .......... 359/634 |
| 6,343,864 | B1* | 2/2002 | Tajiri ........................ 353/20 |
| 6,375,330 | B1* | 4/2002 | Mihalakis ................... 353/31 |

(Continued)

FOREIGN PATENT DOCUMENTS

CN 1363846 A 8/2002

(Continued)

OTHER PUBLICATIONS

Office Action issued by Japanese Patent Office on Oct. 17, 2006 related to Japanese Application No.: 2004-063106.

*Primary Examiner*—William C. Dowling
(74) *Attorney, Agent, or Firm*—Sughrue Mion, PLLC

(57) ABSTRACT

An image display apparatus which includes at least one light source to generate and radiate a light beam, a color separating unit to separate the light beam emitted from the light source into a plurality of color light beams and make at least one of the separated color light beams and the other color light have different polarizations. Further, a plurality of light valves are used to form an image by controlling at least one of the color light beams separated by the color separating unit and emitted therefrom, in the unit of pixel according to input image signals. Additionally, an image combiner is used to combine images generated by the light valves.

32 Claims, 17 Drawing Sheets

U.S. PATENT DOCUMENTS

| | | | |
|---|---|---|---|
| 6,553,168 B2* | 4/2003 | Saccomanno | 385/116 |
| 6,626,540 B2* | 9/2003 | Ouchi et al. | 353/31 |
| 6,628,346 B1* | 9/2003 | Ebiko | 349/9 |
| 6,669,343 B2 | 12/2003 | Shahzad et al. | |
| 6,827,450 B1 | 12/2004 | McGettigan et al. | |
| 2002/0051100 A1* | 5/2002 | Kwon et al. | 349/5 |
| 2002/0135856 A1 | 9/2002 | Penn | |
| 2002/0191154 A1 | 12/2002 | Shahzad et al. | |
| 2003/0147051 A1* | 8/2003 | Fujita et al. | 353/31 |
| 2003/0151725 A1* | 8/2003 | Hayashi et al. | 353/31 |
| 2004/0070734 A1* | 4/2004 | Suzuki et al. | 353/20 |
| 2004/0196644 A1 | 10/2004 | Kim et al. | |
| 2004/0233342 A1 | 11/2004 | Kim et al. | |
| 2004/0233390 A1 | 11/2004 | Kim et al. | |
| 2004/0246442 A1 | 12/2004 | Lee et al. | |
| 2004/0246445 A1 | 12/2004 | Cho et al. | |
| 2004/0246446 A1 | 12/2004 | Lee et al. | |
| 2004/0246589 A1 | 12/2004 | Kim et al. | |
| 2004/0257387 A1 | 12/2004 | Cho et al. | |
| 2004/0263789 A1 | 12/2004 | Kim et al. | |
| 2005/0012902 A1 | 1/2005 | Kim et al. | |

FOREIGN PATENT DOCUMENTS

| | | |
|---|---|---|
| JP | 03-208013 A | 9/1991 |
| JP | 11281930 | 10/1999 |
| JP | 2001-100155 A | 4/2001 |
| KR | 1999-002347 | 1/1999 |

* cited by examiner

COLOR SEPARATING UNIT AND PROJECTION TYPE IMAGE DISPLAY APPARATUS EMPLOYING THE SAME

This application claims the priorities of Korean Patent Application No. 2003-14152 and Korean Patent Application No. 2003-42770, respectively filed on Mar. 6, 2003 and Jun. 27, 2003, in the Korean Intellectual Property Office, and Provisional U.S. Patent Application No. 60/464,092, filed on Apr. 21, 2003, in the U.S. Patent and Trademark Office, the disclosures of which are incorporated herein in their entirety by reference.

BACKGROUND OF THE INVENTION

1. Field of the Invention

The present invention relates to a color separating unit having an improved color separation structure and a projection type image display apparatus employing the same which can illuminate a color light beam at a high optical efficiency and make a compact optical system.

2. Description of the Related Art

In general, a projection type image display apparatus is a system for providing a large picture by magnifying and projecting an image, which is generated from a micro display, that is, a light valve, such as a liquid crystal display or a digital micromirror display, onto a screen by using a projection optical system.

The image display apparatus can be classified into a one-panel type and a three-panel type according to the number of the employed micro displays. The three-panel type image display apparatus which uses three light valves arranged on optical paths separated for red, blue, and green has a high optical efficiency, but optical configuration thereof is complex and a manufacturing cost is high, compared to the one-panel type image display apparatus.

The one-panel type image display apparatus typically adopts a color wheel to periodically change an input white light beam into red, blue, and green beams, which is advantageous in the simplified configuration. However, by adopting the color wheel, loss in the amount of light by ⅔ occurs so that the optical efficiency is lowered compared to the three panel type. To address the above problem, an improved one-panel type image display apparatus has been suggested as shown in FIG. 1.

Referring to FIG. 1, in a conventional one-panel type image display apparatus, an unpolarized white light beam is generated and radiated by a light source 11. The radiated white light beam becomes a uniform beam while passing through a fly eye lens array 13 for mixing an input beam to make a uniform beam and then proceeds toward a polarization conversion system 15. The polarization conversion system 15 converts the polarization direction so that the unpolarized white light beam emitted from the light source 11 becomes a white light beam having one polarization direction. The white light beam passing through the polarization conversion system 15 is separated into red, blue, and green beams by first and second dichroic mirrors 17 and 19. That is, the first dichroic mirror 17 reflects a blue wavelength beam of the input white light beam and transmits the other beams thereof. The transmitting beam is separated into a green beam and a red beam by the second dichroic mirror 19.

First through third scanning prisms 21, 23, and 25 which periodically scrolls the input beam are arranged on the optical paths for the respective separated colors. Each of the first through third scanning prisms 21, 23, and 25 has a rectangular column shape and is rotated by a driving source (not shown). As each of the first through third scanning prisms 21, 23, and 25 is rotated by the driving source, an angle formed by an optical axis and a side wall of the prism changes on the optical path so that the proceeding path of the light beam passing through the prism changes periodically.

The initial angles of the first through third scanning prisms 21, 23, and 25 are set such that the light beams transmitting the first through third scanning prisms 21, 23, and 25 are radiated by dividing an effective image area of a display device 33 into three regions while the first through third scanning prisms 21, 23, and 25 rotate on the optical path. Thus, according to the driving state of the first through third scanning prisms 21, 23, and 25, as shown in FIG. 2, the separated color light beams are scanned in the effective image area of the light valve 33 by repeating an order of (B, R, G)→(G, B, R)→(R, G, B).

The light beams passing through the first through third scanning prisms 21, 23, and 25 are synthesized by the third and fourth dichroic mirrors 27 and 29. Reflection mirrors 18 and 20 are arranged between the first dichroic mirror 17 and the third dichroic mirror 27, and the second dichroic mirror 19 and the fourth dichroic mirror 29, respectively, to change the proceeding path of the light beam.

The light beam scrolled and passing through the fourth dichroic mirror 29 is incident on a polarizing beam splitter 31 which transmits or reflects the incident beam according to the polarization of the light beam. The light beam reflected by the polarizing beam splitter 31 is periodically scrolled, as shown in FIG. 2, and incident on the light valve 33. The light valve 33 controls the incident beam in unit of pixels to form an image. The image is generated by changing the polarization of an output beam in unit of pixels. The light beam having a polarization different from that of the incident beam transmits the polarizing beam splitter 31 and proceeds toward the projection lens unit 35. The projection lens unit 35 magnifies and projects the input image onto a screen 50.

The image display apparatus includes a plurality of relay lenses 41, . . . , 48 on the optical path to transfer the light beam emitted from the light source 11 to the light valve 33.

However, although the optical configuration of the conventional image display apparatus adopts the single light valve to realize a color image, the optical configuration thereof is very complex.

SUMMARY OF THE INVENTION

To solve the above and/or other problems, the present invention provides a color separating unit having an improved color separation structure and a projection type image display apparatus employing the same having an improved structure to scroll color light beams separated by the color separating unit so that a compact optical system is obtained and a color light beam is illuminated at a high efficiency.

According to an aspect of the present invention, an image display apparatus comprises at least one light source to generate and radiate a light beam, a color separating unit to separate the light beam emitted from the light source into a plurality of color light beams and make at least one of the separated color light beams and the other color light have different polarizations, a plurality of light valves to form an image by controlling at least one of the color light beams separated by the color separating unit and emitted therefrom, in the unit of pixel according to input image signals, and an image combiner to combine images generated by the light valves.

The color separating unit comprises a plurality of dichroic mirror surfaces which reflect a particular color light only and are inclined with respect to a direction in which the light beam emitted from the light source and separated from each other, and at least one polarization changer to make the color light beam and the other color light beams have different polarizations.

The color separating unit has a rod type single body structure.

The color separating unit comprises a plurality of dichroic prisms having the dichroic mirror surfaces to reflect different color light beams.

The polarization changer is disposed between the dichroic mirror surfaces, in a part of an exit surface where the separated color light beams exit, or on a proceeding path of at least one of the color light beams separated by the dichroic mirror surfaces.

The light valves comprises a first light valve forming an image by using at least one color light having one polarization, and a second light valve forming an image by using the other color light having the other polarization.

The image combiner comprises a polarizing beam splitter selectively transmitting or reflecting incident color light beams having different polarizations to proceed toward the first and second light valves, and the color light beams are separated according to the polarization thereof and illuminated to the first and second light valves so that combine images generated by the first and second light valves.

The image combiner comprises a pair of wave plates disposed between the polarizing beam splitter and the first light valve and between the polarizing beam splitter and the second light valve, to change the polarization of incident light.

The color separating unit separates the light beam emitted from the light source into three or more color light beams and makes at least one of the separated color light beams and the other color light beams have different polarizations.

According to another aspect of the present invention, an image display apparatus comprises at least one light source to generate and radiate a light beam, and a color separating unit having four or more dichroic mirror surfaces which reflect different color lights, where the mirror surfaces are inclined to a direction in which the light beam emitted from the light source proceeds, and are separated from one another, to separate the light beam emitted from the light source into four or more color light beams. The color separating unit has a rod type structure, and at least one light valve to form an image by controlling the color light beams by unit of pixels according to an input image signal.

The color separating unit comprises four or more dichroic prisms having the dichroic mirror surfaces which reflect different color light beams.

The color separating unit further comprises at least one polarization changer which makes at least one color light beam of the four or more color light beams separated by the dichroic mirror surfaces and the other color lights thereof have different polarizations.

The light valve comprises a first light valve forming an image by using at least one color light having one polarization, and a second light valve forming an image by using the other color light having the other polarization, and further comprising an image combiner to combine images generated by the first and second light valves.

The color separating unit separates the light beam emitted from the light source into a cyan beam C, a blue beam B, a red beam R, and a green beam G, or a blue beam B, a cyan beam C, a magenta beam M, a red beam R, a green beam G, and a yellow beam Y.

The image display apparatus further comprises a polarization aligner which is provided at an input end of the color separating unit to align the light beam emitted from the light source in one polarized beam to be incident on the color separating unit.

The image display apparatus further comprises at least one scrolling unit to scroll the color light beams separated by the color separating unit.

The color separating unit comprise at least one lens cell formed to convert a rotational motion thereof to a linear motion of a lens array.

Assuming that at least one of the color light beams separated by the color separating unit is a first color light group and at least one of the other color light beams is a second color light group, the color separating unit separates the first and second color light groups from each other so that the light beams of the first and second color light groups are incident on the scrolling unit by being separated from each other.

The color separating unit is provided to make the light beams of the first and second color light groups have different polarizations.

The scrolling unit comprises a single scrolling unit or a pair of scrolling units.

The image display apparatus further comprises an optical block to combine proceeding paths of the light beams of the first and second color light groups passing through the scrolling unit.

The optical unit comprises a first reflection surface to reflect the light beam of one of the first and second color light groups, and a second reflection surface to selectively transmit and reflect the light beam of one color light group reflected by the first reflection surface and the light beam of the other color light group, so as to combine optical paths of the light beams.

The optical unit is a scroll changing prism which changes a scroll direction by reversing through a process of reflecting a color bar to at least one color light beam passing through one effective area of the scroll unit, and selectively transmits and reflects at least one color light incident thereon with a scroll changed in the reflection process and the other color light beam passing through the other effective area of the scrolling unit. The optical unit also combines the optical paths of the light beams of the first and second color light groups.

The scroll changing prism has a shape of an Amichi prism.

The optical unit selectively transmits and reflects at least one color light incident thereon with a scroll changed in the reflection process and the other color light beam passing through the other effective area of the scrolling unit, according to polarization so as to combine the optical paths of the light beams of the first and second color light groups.

The color light beams separated by the color separating unit are incident on the same effective area of the scrolling unit.

At least one lens cell of the scrolling unit is spiral.

The lens cell of the scrolling unit is a cylindrical lens.

The scrolling unit comprises first and second spiral lens discs separated from each other in a direction in which the light beam proceeds and having the lens cell formed on each of the first and second spiral discs.

The image display apparatus further comprises a glass rod provided on the optical path between the first and second spiral lens discs.

The image display apparatus further comprises at least one first cylindrical lens disposed on the optical path between the light source and the scrolling unit to control a width of the light beam incident on the scrolling unit, and at least one second cylindrical lens disposed on the optical path of the light beam passing through the scrolling unit to change the light beam passing through the scrolling unit a parallel beam.

The image display apparatus further comprises a fly eye lens array disposed on an optical path of the light emitted from the scrolling unit, to make color light beams scrolled by the scrolling unit form color bars in different areas.

The image display apparatus further comprises a relay lens disposed on an optical path of the light beam passing through the fly eye lens array, to have the color bar formed by the fly eye lens array condensed at a predetermined position.

The image display apparatus further comprises a spatial filter disposed between the light source and the color separating unit to adjust a divergent angle of the light beam emitted from the light source.

The image display apparatus further comprises a plurality of relay lenses disposed on optical paths of the color light beams emitted from the color separating unit to make each of the emitted color light beams have a predetermined divergent angle.

According to yet another aspect of the present invention, a color separating unit which separates a light beam emitted from the light source into a plurality of color light beams and makes at least one of the separated color light beams and the other color light beams have different polarizations.

The color separating unit comprises a plurality of dichroic mirror surfaces which reflect different color light beams and are inclined with respect to a proceeding direction of an incident light beam and separated from each other, and at least one polarization changer to make the color light beam and the other color light beams have different polarizations.

The color separating unit is of a rod type.

According to yet further another aspect of the present invention, a color separating unit comprises four or more dichroic mirror surfaces which reflect different color light beams, are inclined with respect to a proceeding direction of an incident light beam emitted from the light source and separated from one another, and separating the incident light beam into four or more color light beams and being of a rod type.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
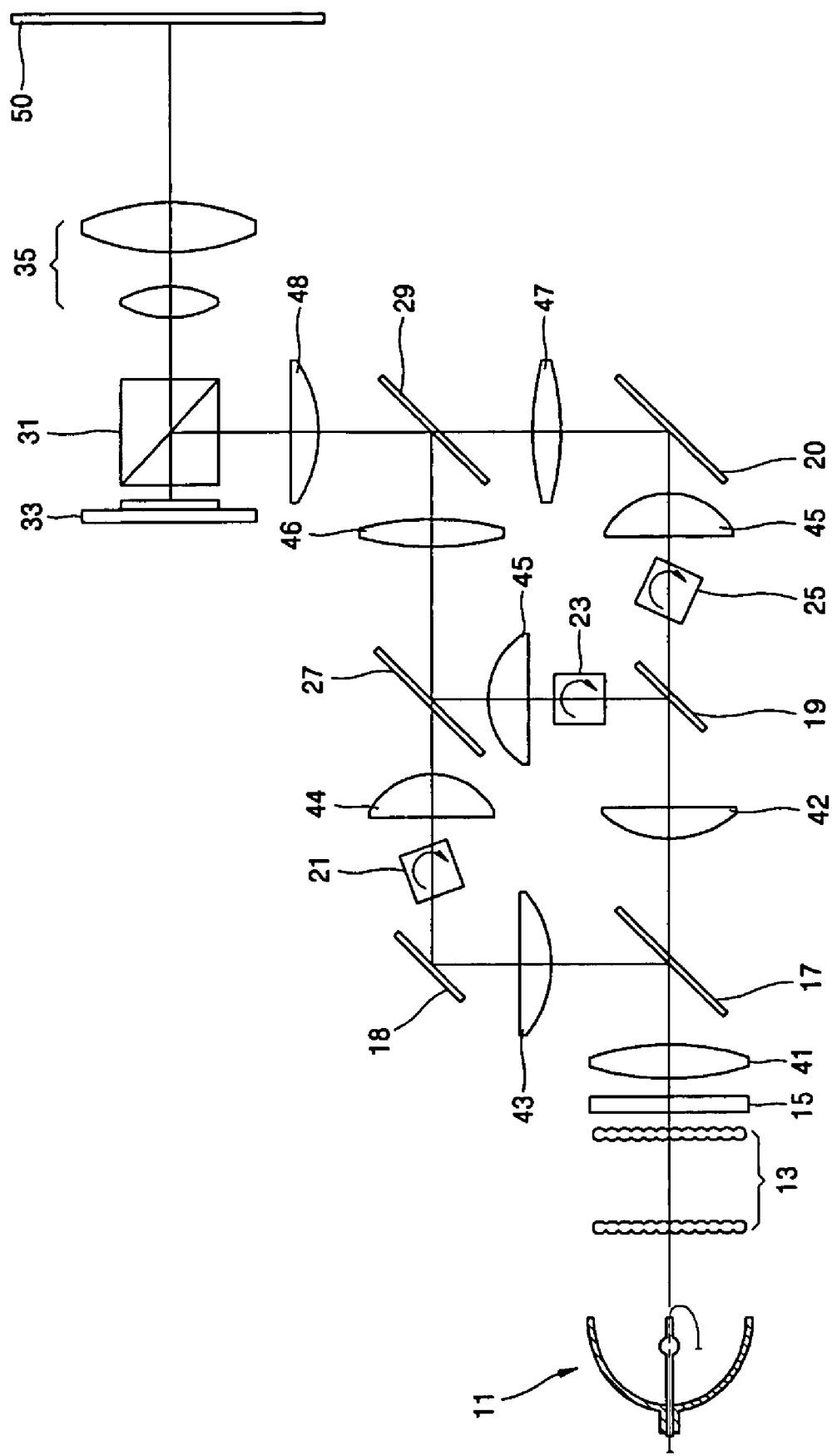
FIG. 1 is a view illustrating the optical configuration of a conventional one panel type projection image display apparatus employing a color illuminating system.
Figure 2:
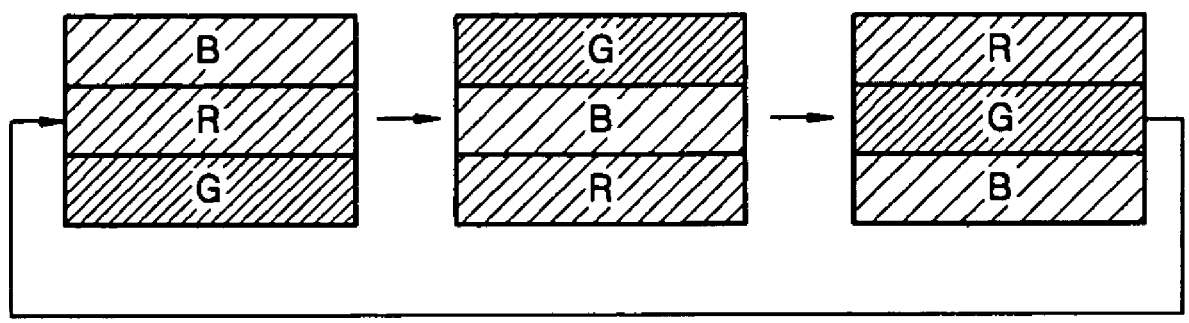
FIG. 2 is a view illustrating changes in the separated color bar according to the operation of the scanning prism of FIG. 1.
Figure 3:
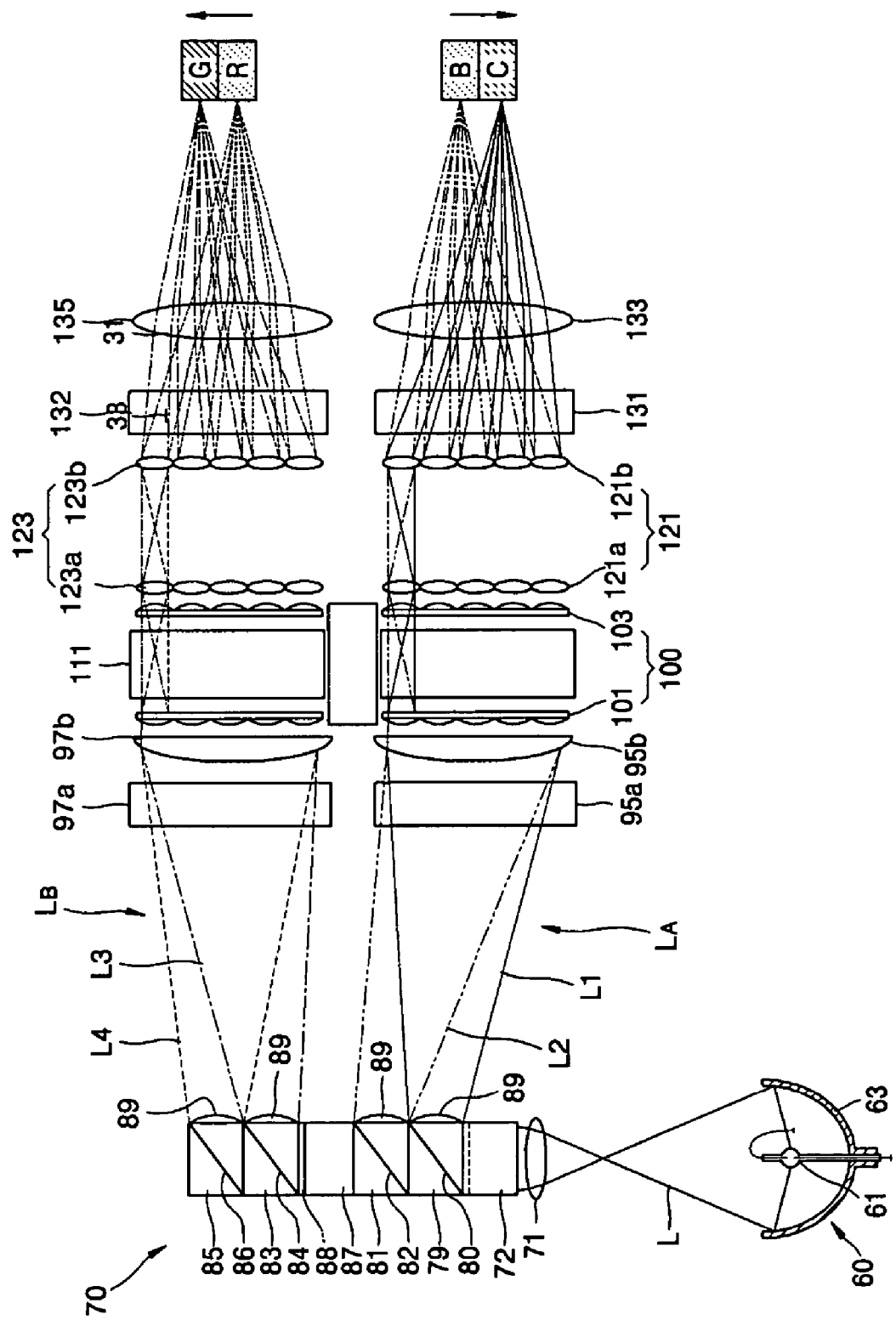
FIG. 3 is a view illustrating the optical configuration of a color illuminating system according to a preferred embodiment of the present invention.

Referring to FIG. 3, a color illuminating system according to a preferred embodiment of the present invention, which is employed in a projection type image display apparatus, includes a light source 60 radiating a white light beam and a color separating unit 70 separating the white light beam emitted from the light source 60 into a plurality of color light beams, preferably, three or more color light beams. Preferably, the color illuminating system further includes a scrolling unit 100 which periodically scrolls the color light beams separated by the color separating unit 70 by a rotational motion.

The light source 60 generates and radiates a white light beam and includes a lamp 61 generating light and a reflection mirror 63 reflecting light emitted from the lamp and guiding the reflected light along a proceeding path. The reflection mirror 63 is oval or parabolic. That is, an oval mirror has one focus at the position of the lamp 61 and the other focus at a point where light is condensed. A parabolic mirror makes the light emitted from the lamp 61 and reflected by the reflection mirror 63 parallel. FIG. 3 shows a case of adopting an oval mirror as the reflection mirror 63.

As shown in FIG. 3, when the light source 60 and the reflection mirror 63 are oval mirrors, a convergent light beam emitted from the light source 60 is condensed at a focal point and then divergent after the focus of the oval mirror. Thus, a collimating lens 71 is preferably provided at an input end of the color separating unit 70 to condense the light beam emitted from the light source 60 and make the condensed light beam a parallel beam.

The collimating lens 71 to make the light beam emitted from the light source 60 a parallel beam having a small beam diameter is arranged such that the diameter of the light beam emitted from the light source 60 can be reduced to a ratio of about 5:1.

Assuming that a divergence angle of a light beam emitted from at the light source 60 is ±2 degrees, the divergence angle of a light beam reduced by the collimating lens 71 increases to ±10 degrees according to the preservation of Etendue. The parallel beam having a beam diameter reduced by the collimating lens 71 to the ratio of 5:1 is incident on the color separating unit 70. When the parallel beam which is reduced by such an arrangement of the collimating lens 71 is incident on the color separating unit 70, the optical system can be made compact.

When the light source 60 has a parabolic mirror as the reflection mirror 63, a condensing lens (not shown) which converts a substantially parallel beam emitted from the light source 60 into a condensing beam is preferably further included. In this case, the collimating lens 71 changes the light beam which focuses at a focal point by the condensing lens, passes the focal point, and then diverges again, into a parallel beam. The collimating lens 71 is arranged such that the beam diameter thereof can be reduced to a ratio of 5:1 compared to that of the light source emitted from the light source 60.

In the meantime, a spatial filter 65 having a slit is preferably further provided between the light source 60 and the collimating lens 71. The spatial filter 65 adjusts a divergent angle, or Etendue, of the light beam emitted from the light source 60. When an oval mirror is provided as the reflection mirror 63, the spatial filter 65 is disposed at the focal point of the oval mirror. Here, when a parabolic mirror is provided as the reflection mirror 63 and a condensing lens is further provided, the spatial filter 65 is preferably disposed at the focal point of the condensing lens.

The spatial filter 65 is preferably provided to adjust the width of the slit in a color separating direction by the color separating unit 70 or in a color scrolling direction by the scrolling unit 100.

When the Etendue or the divergent angle of the incident light beam of the optical system of the projection type image display apparatus according to the present invention is adjusted by using the spatial filter 65, a plurality of color bars formed on an upper surface, that is, a light valve, can be clearly separated so that the quality of an image can be improved. That is, when the light beam emitted from the light source 60 is divergent over an allowable angle of the optical system, an overlapping portion may occur between the color bars formed on the light valve. Then, the light beam over the allowable angle of the optical system is removed by using the spatial filter 65 so that the color bars can be clearly separated.

When a black bar is formed by adjusting the width of the slit and reducing the area of the color bars, as necessary, and when an LCD device is used as the light valve, an image signal process can be smoothly performed. That is, in a case in which an LCD device is used as the light valve, when the color bars are continuously scrolled, the image signal changes whenever the color bars change. It may be difficult to continuously process the changed image signal. In this case, the time for processing the image signal between the color bars is needed and the black bar is needed between the color bars to obtain the time. This can be solved by appropriately adjusting the width of the slit of the spatial filter 65.

Here, Etendue indicates the optical preservation physical quantity of an optical system. Assuming that a start point of the optical system is the light source and an object is the light valve, and when the Etendue of the light source is greater than that of the entire system, the area of the color bars increases so that a phenomenon that the colors are mixed at a boundary surface of the respective color bars occurs. When the Etendue of the light source is smaller than that of the entire system, since the area of the color bars increases, the area of the black bar decreases so that the black bar is generated between the respective color bars.

Thus, by providing the spatial filter 65, the Etendue can be controlled so that the colors are prevented from being mixed at the boundary surface of the color bars. The black bar can be formed between the respective color bars, if necessary.

Here, the spatial filter 65 can be variously changed according to the purpose thereof. For example, when the spatial filter 65 is formed to independently adjust the area of each color bar, a color gamut can be improved and a color balance can be adjusted.

The color separating unit 70 separates the light beam emitted from the light source 60 into a plurality of color light beams, for example, three or more color light beams. The color separating unit 70 preferably has a structure to make one of the separated color light beams have polarization different from that of the other separated color light beams. Here, the color separating unit 70 may be provided to separate the light beam emitted from the light source 60 into three through eight color light beams. Preferably, the color separating unit 70 is provided to separate the incident light beam into four or more color light beams. FIG. 3 shows an example that the color separating unit 70 separates a white light beam emitted from the light source 60 into four color light beams.

The color separating unit 70 is inclined with respect to a proceeding direction of the light beam emitted from light source 60, and separated therefrom, to separate the incident light beam by color. The color separating unit 70 has a plurality of dichroic mirror surfaces 80, 82, 84, and 86 for reflecting different color light beams. Here, the number of the dichroic mirror surfaces 80, 82, 84, and 86 is the same as that of the color light beams to be separated. The color separating unit 70 preferably further includes at least one polarization changer 88 such that at least one of the separated color light beams and at least one of the other separated color light beams have the same polarization.

Figure 4:
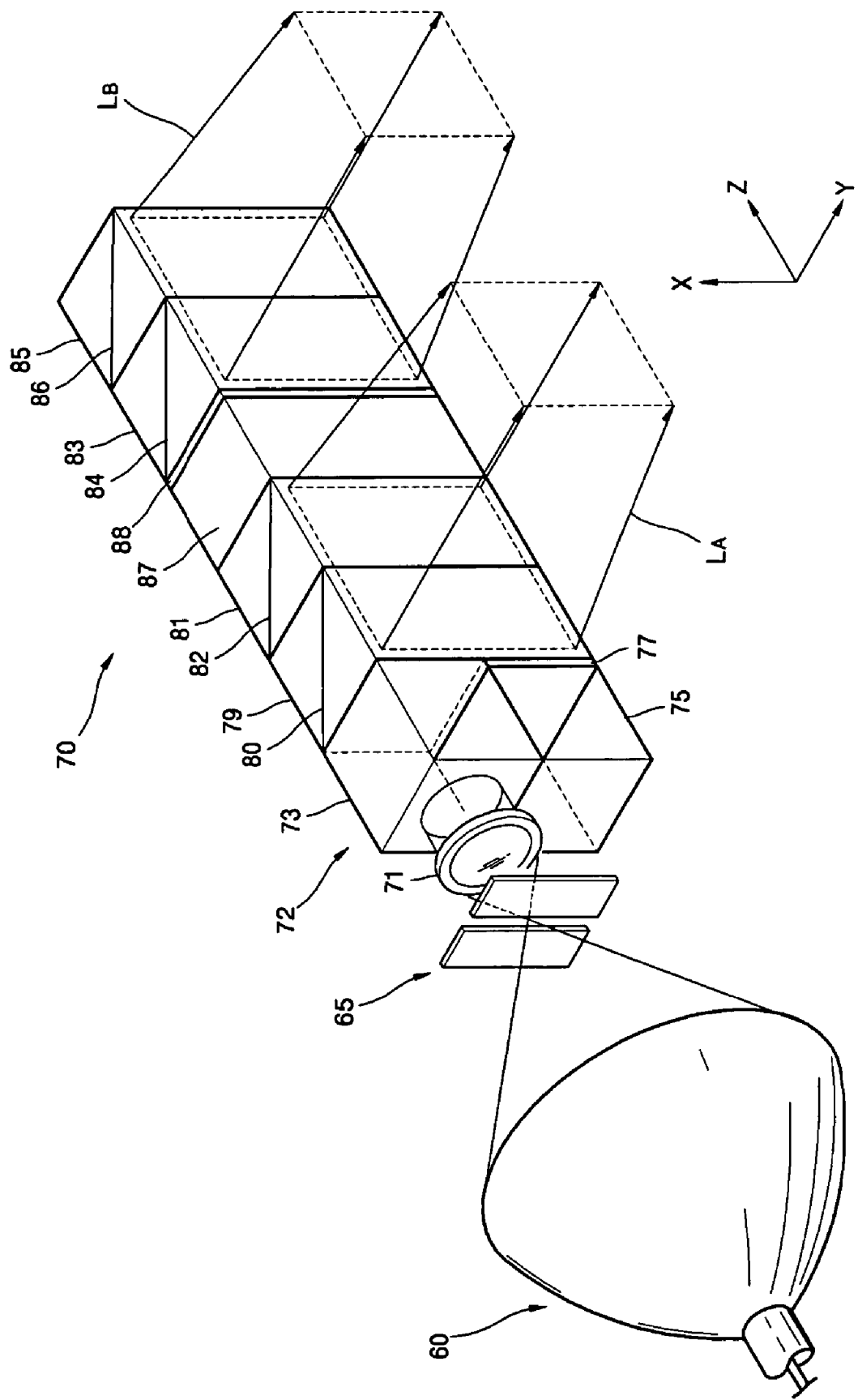
FIG. 4 is a perspective view illustrating the light source and the color separating unit of FIG. 3.
Figure 5:
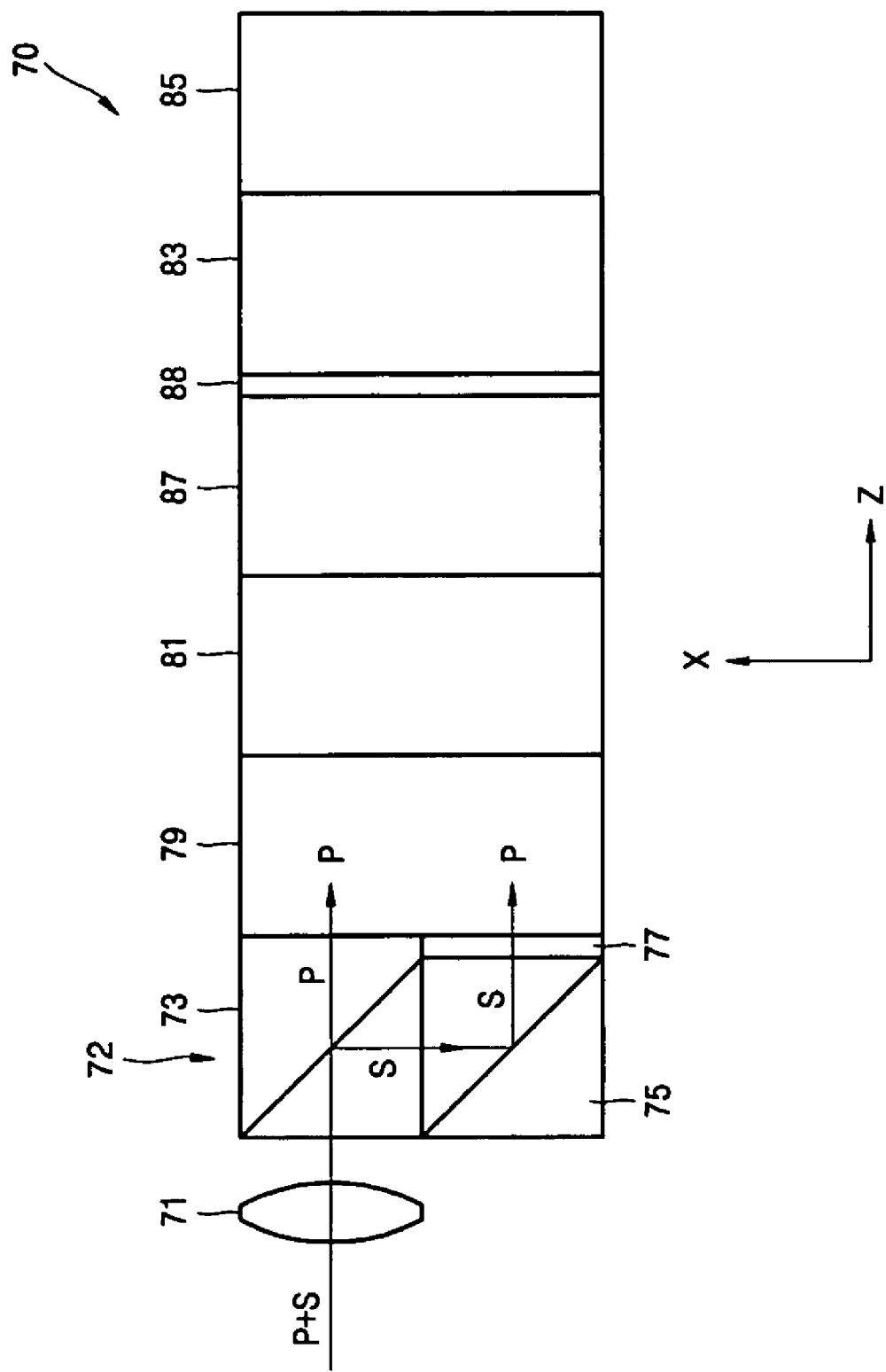
FIG. 5 is a front view of the color separating unit of FIG. 4.

The color separating unit 70, as shown in FIGS. 3 through 5, includes four dichroic mirror surfaces 80, 82, 84, and 86, which are separated from one another and separate the white light beam emitted from the light source 60 into four color light beams, and the polarization changer 88 provided between the two dichroic mirror surfaces 82 and 84 so that two color light beams emitted from the light source 60, and reflected by the two dichroic mirror surfaces 80 and 82, and two color light beams reflected by the other two dichroic mirror surfaces 84 and 86 have different polarizations from each other. Here, the four color light beams may be cyan (C), blue (B), red (R), and green (G).

FIG. 4 is a magnified perspective view illustrating a portion of the color separating unit 70 of FIG. 3. FIG. 5 is a front view of the color separating unit of FIG. 4.

The color separating unit 70, as shown in FIGS. 3 through 5, is preferably formed as a rod type single body in which first through fourth dichroic prisms 79, 81, 83, and 85 include dichroic mirror surfaces 80, 82, 84, and 86, respectively, and reflects particular color light beams and separate incident light L into first through fourth color light beams $L_1$, $L_2$, $L_3$, and $L_4$, which are integrally formed.

When the color separating unit 70 is formed to have a rod type structure by using the dichroic prisms 79, 81, 83, and 85, light input at an angle greater than the critical angle satisfying an internal total reflection condition is totally reflected by a surface forming the outer appearance of the color separating unit 70. Thus, the color separating unit 70 can increase an efficiency in use of the incident light L.

The first dichroic prism 79 has a first dichroic mirror surface 80 arranged inclined to the proceeding direction of the incident light L, that is, an optical axis. The first dichroic mirror surface 80 transmits a first color light beam L1 of the incident light L and transmits the other light beam. For example, the first dichroic mirror surface 80 reflects a cyan beam C and transmits beams of the other wavelengths.

The second dichroic prism 81 is arranged close to the first dichroic prism 79 and includes a second dichroic mirror surface 82 which is inclined to the optical axis of the incident light L. The second dichroic mirror surface 82 reflects a second color light $L_2$, for example, a blue beam B, and transmits the other light beam.

The third dichroic prism 83 is arranged close to the second dichroic prism 81 and includes a third dichroic mirror surface 84 which is inclined to the optical axis of the incident light. The third dichroic mirror surface 84 reflects a third color light $L_3$, for example, a red beam R.

The fourth dichroic prism 85 is arranged close to the third dichroic prism 83 and includes a fourth dichroic mirror surface 86 which is inclined to the optical axis of the incident light. The fourth dichroic mirror surface 86 reflects a fourth color light L4, for example, a green beam G. The fourth dichroic mirror surface 86 may be replaced with a total reflection mirror capable of totally reflecting the incident light.

The first through fourth dichroic prisms 79, 81, 83, and 85 totally reflect light incident on the surface forming the outer appearance at an angle greater than the critical angle satisfying an internal total reflection condition due to a difference in the refractive index between the dichroic prisms and the external air.

In the above rod type color separating unit 70, among the first through fourth color light beams reflected by the first through fourth dichroic mirror surfaces 80, 82, 84, and 86, the first through fourth color light beams $L_1$, $L_2$, $L_3$, and $L_4$ of the range shown in FIG. 4 are used as effective light while the other light beams are not used.

In the preferred embodiments described with reference to FIGS. 3 through 5 and thereafter, the color separating unit 70 according to the present invention has a rod type structure incorporating a plurality of dichroic prisms, which is a mere exemplary. That is, the color separating unit 70 according to the present invention can be formed of a rod type single body structure in which a plurality of dichroic mirror surfaces are used. For example, first through fourth dichroic mirror surfaces 80, 82, 84, and 86 which reflect different color light beams separated apart from one another are combined by a housing (not shown). Also, the color separating unit 70 according to the present invention is not formed of a single body structure and has a plurality of dichroic mirror surfaces and at least one polarization changer.

The color separating unit 70 according to the present invention, for example, assuming that at least one color light among the first through fourth color light beams $L_1$, $L_2$, $L_3$, and $L_4$ is a first color light group $L_A$ and that at least one of the remaining color light beams is a second color light group LB, the first and second color light beams LA and LB are separated from each other so that the light beam of the first color light group LA and the second color light group LB are incident on the scrolling unit 100 by being separated from each other. Here, in consideration of the scrolling operation of the scrolling unit 100 and the use of two light valves, the polarization changer 88 is preferably arranged to make the polarizations of the light beams of the first and second color light groups LA and LB different from each other.

To separate the first and second color light groups LA and LB, the color separating unit 70 further includes an optical block 87, as shown in FIGS. 3 through 5.

FIGS. 3 through 5 show a case in which the first color light group includes the first and second color light beams $L_1$ and $L_2$, for example, a cyan beam C and a blue beam B, reflected by the first and second dichroic mirror surfaces 80 and 82, the second color light group includes the third and fourth color light beams $L_3$ and $L_4$, for example, a red beam R and a green beam G, reflected by the third and fourth dichroic mirror surfaces 84 and 86, and the optical block 87 is provided between the second and third dichroic mirror surfaces 82 and 84.

When each of the first and second color light groups $L_A$ and $L_B$ includes two color light beams, the polarization of the light beams of the first and second color light groups $L_A$ and $L_B$ are different from each other, and the image display apparatus having a like color illuminating system includes two light valves. As described later with reference to FIGS. 11, 12, 13, and 14, each light valve displays an image for two color light beams and a color image is displayed by mixing images formed by the respective light valves on a screen.

Alternatively, the optical block 87 can be positioned in the color separating unit 70 such that the first color light group $L_A$ includes the first color light $L_1$ and the second color light group $L_B$ includes the second through fourth color light beams $L_2$, $L_3$, and $L_4$, or the first color light group $L_A$ includes the first through third color light beams $L_1$, $L_2$, and $L_3$ and the second color light group $L_B$ includes the fourth color light $L_4$ only. In this case, when the image is displayed by using two light valves, each light valve generates an image for one color light or three color light beams. A color image is displayed by mixing the image formed by the respective light valves on the screen. In this case, when an image is displayed by using two light valves, each light valve generates an image for one color light and three color light beams and the image formed by the respective light valves are mixed on a screen so that a color image is displayed.

When the separation distance between the light beam of the first color light group $L_A$ and the light beam of the second color light group $L_B$ is increased by using the optical block 87, as set forth below, the light beams of the first and second color light groups $L_A$ and $L_B$ proceed toward at least two effective areas A and B, of FIG. 7, of the spiral lens disc 101 of the single scrolling unit 100, or the effective areas C and D, of FIG. 15, of different spiral lens discs 101, to avoid the position of a driving source 105, of FIG. 8, of the spiral lens disc 101.

Thus, by appropriately setting the separation distance between the light beams of the first and second color light groups $L_A$ and $L_B$ by disposing the optical block 87 between the dichroic mirror surfaces reflecting the light beams of the first and second color light groups $L_A$ and $L_B$, the amount of light incident on the effective areas A and B of the spiral lens disc 101 of the scrolling unit 100 can be maximized so that a light use efficiency is improved.

In FIGS. 3 through 5, to make the light beams of the first and second color light groups $L_A$ and $L_B$ have different polarizations, the polarization changer 88 is arranged between the dichroic mirror surface, for example, the second dichroic mirror surface 82, reflecting color light included in the first color light group $L_A$ and the dichroic mirror surface, for example, the third dichroic mirror surface 84, reflecting color light included in the second color light group $L_B$.

In his case, the polarization changer 88 is disposed close to the optical block 87. A half wave plate may be provided as the polarization changer 88 which makes the color light beams included in the second color light group $L_B$ have a P polarization, for example, when the color light beams included in the first color light group $L_A$ have an S polarization, for example.

When the optical block 87 and the polarization changer 88 are provided, the light beam of the first color light group $L_A$ having one polarization and the light beam of the second color light group $L_B$ having the other polarization are emitted from of the color separating unit 70, by being separated from each other.

In FIGS. 3 through 5, the color, separating unit 70 according to a preferred embodiment of the present invention includes a single polarization changer so that the light beams of the first and second color light groups LA and LB have different polarizations. However, the position and number of the polarization changer may vary.

For example, when the polarization changers functioning as a half wave plate are arranged between the first and second dichroic mirror surfaces 80 and 82, between the second and third dichroic mirror surfaces 82 and 84, and between the third and fourth dichroic mirror surfaces 84 and 86, assuming that the first color light $L_1$ reflected by the first dichroic mirror surface 80 has an S polarization, the second color light $L_2$ reflected by the second dichroic mirror surface 82 has a P polarization, the third color light $L_3$ reflected by the third dichroic mirror surface 84 has an S polarization, and the fourth color light $L_4$ reflected by the fourth dichroic mirror surface 86 has a P polarization.

When the color separating unit 70 includes three polarization changers and each of the first and second color light groups $L_A$ and $L_B$ includes two color light beams, the two color light beams included in the first color light group $L_A$ have polarizations which are different from each other. Likewise, the two color light beams included in the second color light group $L_B$ have polarizations which are different from each other.

In another preferred embodiment, the polarization changer 88 may be disposed on a proceeding path of at least one of the color light beams separated by the dichroic mirror surfaces.

Figure 6:
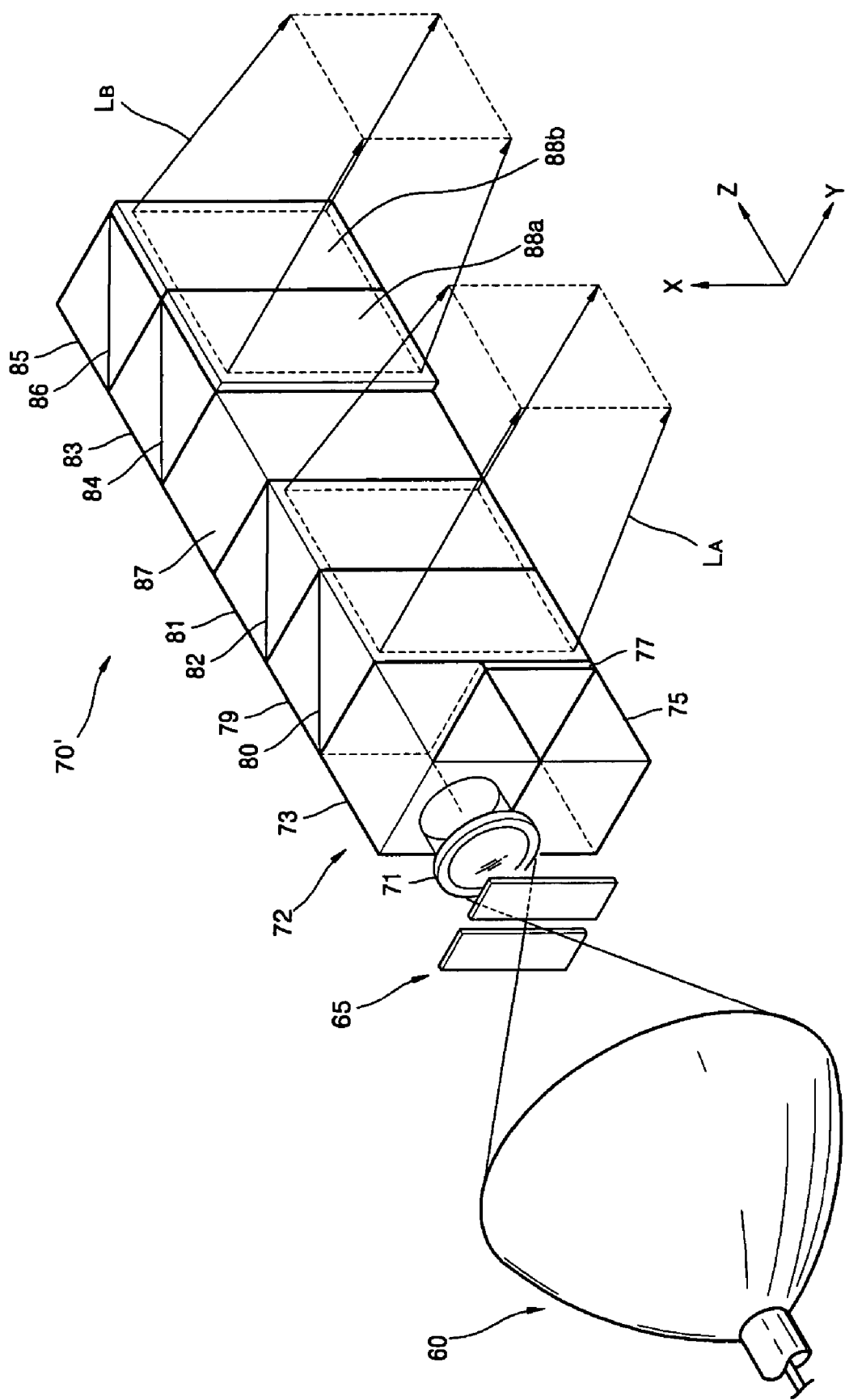
FIG. 6 is a perspective view illustrating another preferred embodiment of the color separating unit.

In detail, the color illuminating system according to the present invention may include a color separating unit 70' having polarization changers 88a and 88b in a partial area of the exit surface thereof, as shown in FIG. 6, instead of the color separating unit 70 having the polarization changer 88 arranged between the dichroic mirror surfaces.

FIG. 6 shows the color separating unit 70' according to another preferred embodiment of the present invention. Referring to FIG. 6, the color separating unit 70' may include the polarization changers 88a and 88b on an exit surface of the third and fourth color light beams $L_3$ and $L_4$, that is, the light beam of the second color light group $L_B$, reflected by the third and fourth dichroic mirror surfaces 84 and 86. A half wave plate for the third color light beam $L_3$ is provided as the polarization changer 88a while a half wave plate for the fourth color light beam $L_4$ is provided as the polarization changer 88b.

Here, in FIG. 6, the polarization changers 88a and 88b are shown to be provided separately. Instead of the separate polarization changers 88a and 88b, a single polarization changer may be provided on the exit surface of the light beam of the second color light group $L_B$.

In FIG. 6, the polarization changers 88a and 88b are integrally formed with the color separating unit 70'. However, the polarization changers 88a and 88b can be arranged separated from the rod type structure of the color separating unit 70' on a proceeding path of a predetermined color light beam, for example, the third and fourth color light beams $L_3$ and $L_4$.

The polarization changer in the color separating unit according to the present invention can be arranged in any position between the dichroic mirror surfaces, in the partial area of the exit surface where the separated color light beams are emitted, and/or on a proceeding path of one of the separated color light beams.

Here, a case in which the optical block 87 is disposed between the dichroic mirror surfaces of the color separating unit 70 or 70' to separate the light beams of the first and second color light groups $L_A$ and $L_B$, is described above. However, the present invention is not limited thereto. That is, instead of the optical block 87, a light beam separation optical device (not shown) to separate the light beams of the first and second color light groups $L_A$ and $L_B$ can be provided at the output portion of the color separating unit 70 or 70'.

Also, in the above descriptions, although the color light beams are separated into two color light groups, that is, the first and second color light groups $L_A$ and $L_B$, the present invention is not limited thereto. The number of the color light groups can be divided into three or more and can be incident on the three or more effective areas of the scrolling unit 100. In this case, at least two color light groups have the same polarization.

In the following descriptions, for the convenience of explanation and illustration, it is assumed that the color illuminating system according to the present invention includes the color separating unit 70, as shown in FIGS. 3 and 5.

The color illuminating system according to the preferred embodiment of the present invention further includes relay lenses 89 on the optical path of each of the first through fourth color light beams $L_1$, $L_2$, $L_3$, and $L_4$ separated by and output from the color separating unit 70. The relay lenses 89 condense each of the first through fourth color light beams $L_1$, $L_2$, $L_3$, and $L_4$ to have a predetermined divergence angle and are preferably arranged to face each of the exit surfaces of the first through fourth dichroic prisms 79, 81, 83, and 85.

The first through fourth color light beams $L_1$, $L_2$, $L_3$, and $L_4$ separated by the color separating unit 70 can be restored by the relay lenses 89 to the same beam diameter and divergence angle as those of the light emitted from the light source 60.

To increase a light use efficiency, the color illuminating system according to the preferred embodiment of the present invention further includes a polarization conversion system (PCS) 72 at an input end of the color separating unit 70 to align the light emitted from the light source 60 to a polarized beam and input it to the color separating unit 70.

Referring to FIG. 5, the polarization conversion system 72 may include a polarization separating member 73 which transmits most of a first polarized beam, for example, a P-polarized beam, of the light output from the light source 60 and reflects most of a second polarized beam perpendicular to the first polarized beam, for example, an S-polarized beam, a reflection member 75 which totally reflects the second polarized beam reflected by the polarization separating member 73 to proceed parallel to the first polarized beam, and a half wave plate 77 arranged on the proceeding path of one of the first and second polarized beams, for example, a proceeding path of the second polarized beam to make the second polarized beam to have the same polarization as that of the first polarized beam, for example, a P-polarized beam.

A polarization separating member to reflect the second polarized beam, for example, an S-polarized beam, may be provided instead of the reflection member 75. The half wave plate 77 is disposed on the proceeding path of the first polarized beam so that both first and second polarized beams have, for example, S polarizations.

According to the polarization conversion system 72 having the above configuration shown in FIG. 5, since the incident beam is separated along a vertical axis, the diameter of a light beam along the vertical axis is doubled and the polarization of a light beam in a lower end portion of the vertical axis is changed by the half wave plate 77 so that the light beams incident on the color separating unit 70 have the same polarization. The polarization of the light beams in the upper and lower ends can be different from each other according to the purpose of use.

Since the unpolarized white light beam emitted from the light source 60 can be input to the color separating unit 70 by being changed to a white light beam having the same polarization by the polarization conversion system 72, even when an LCD device is used as the light valve as described later, the light use efficiency can be improved.

The polarization conversion system 72 and the relay lenses 89 can be incorporated into the color separating unit 70. Also, the collimating lens 71 can be incorporated into the color separating unit 70 with respect to the polarization conversion system 72 interposed therebetween.

Figure 7:
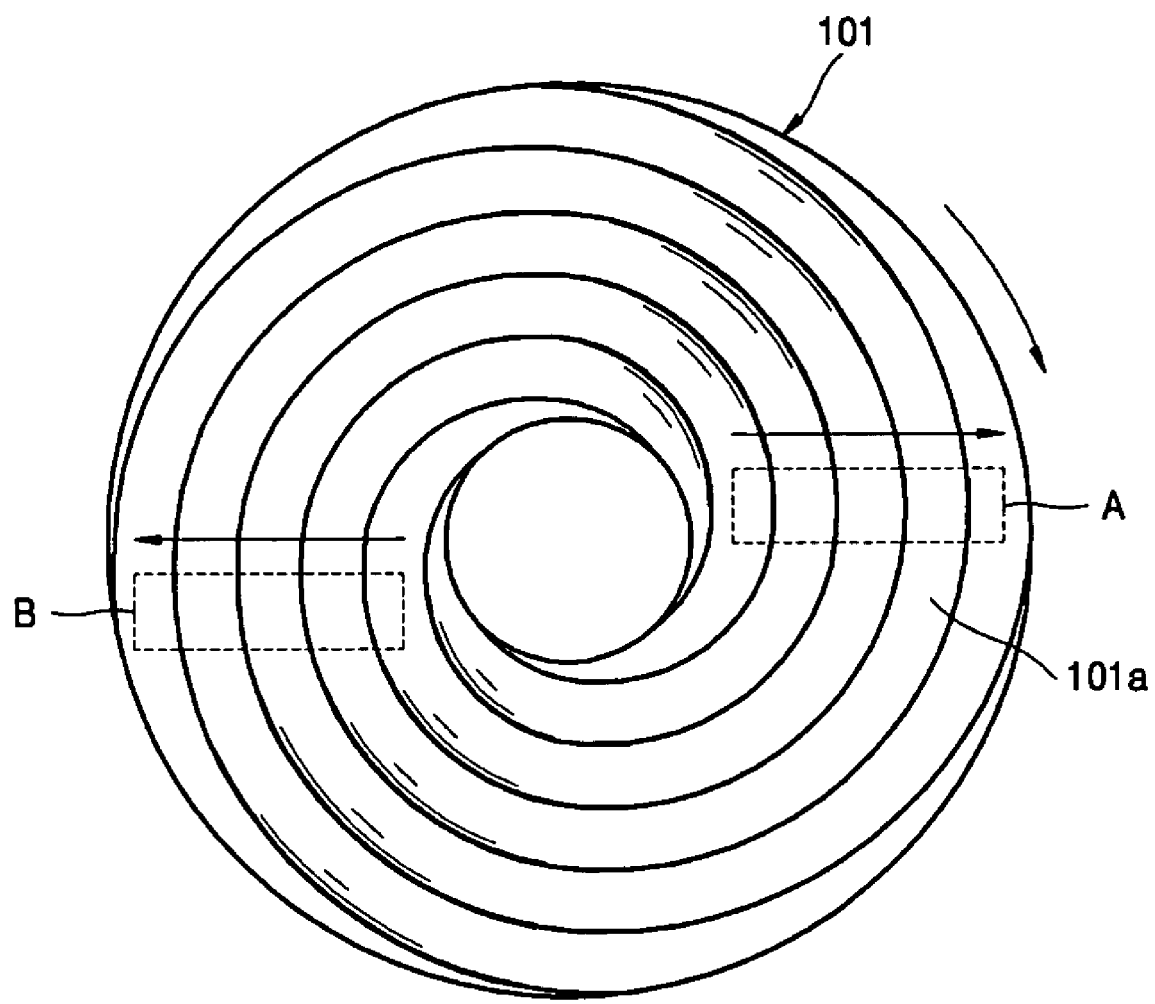
FIG. 7 is a plan view of the spiral lens disc of FIG. 3.
Figure 8:
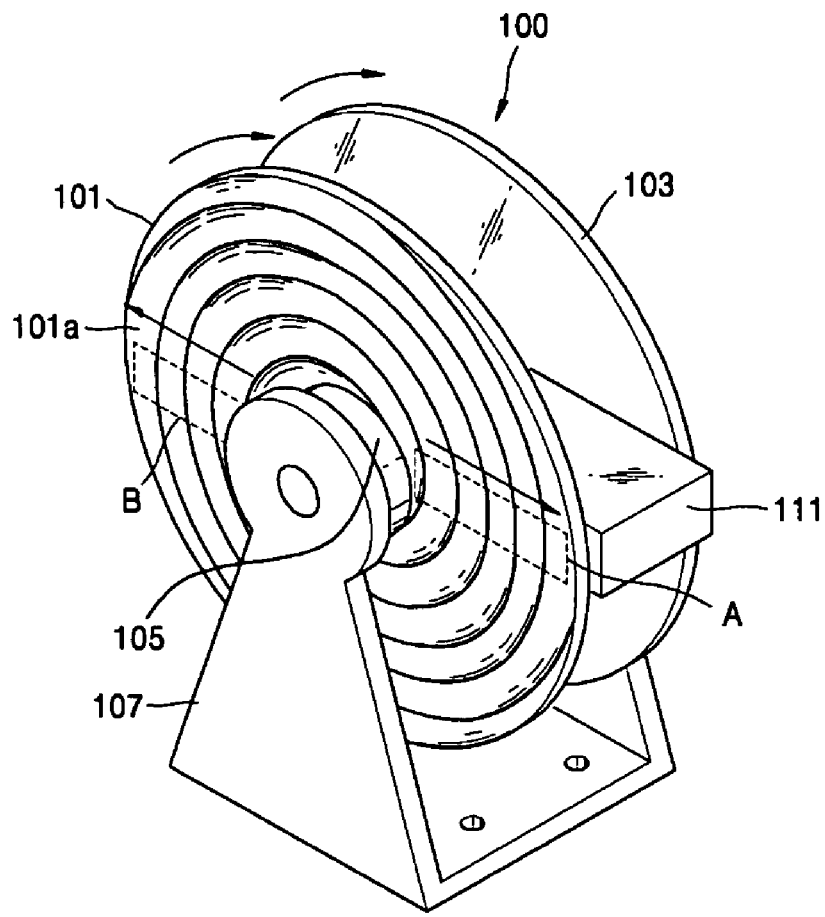
FIG. 8 is a perspective view of the spiral lens disc of FIG. 3.

Referring to FIGS. 3, 7, and 8, the scrolling unit 100 has at least one lens cell 101a which is formed to convert the rotation motion thereof to a linear motion of the lens array. The scrolling unit 100 can be formed of a disc type structure.

Referring to FIG. 7, the scrolling unit 100 may include a first spiral lens disc 101 having at least one lens cell 101a. Also, a second spiral lens disc 103 having the same structure as the first spiral lens disc 101 is arranged to be separated a predetermined distance from the first spiral lens disc 101 in a direction in which the light proceeds to correct a divergence angle of each of the color light beams of the first and second color light groups $L_A$ and $L_B$ which have passed through the first spiral lens disc 101.

Also, a glass rod 111 which can control a divergence angle of a light beam emitted from the scroll unit 101 is further arranged on the optical path between the first spiral lens disc 101 and the second spiral lens disc 103. Thus, by providing the glass rod 111 in the first spiral lens disc 101, the light beam condensed on each cell in the first spiral lens disc 101 can be transferred to the second spiral lens disc 103 without diverging.

The first and second spiral lens discs 101 and 103 of the scrolling unit 100 are arranged on an optical path by being supported by a bracket 107 and rotated by the driving portion 105 provided in the middle portion of the first spiral lens disc 101.

Figure 9:
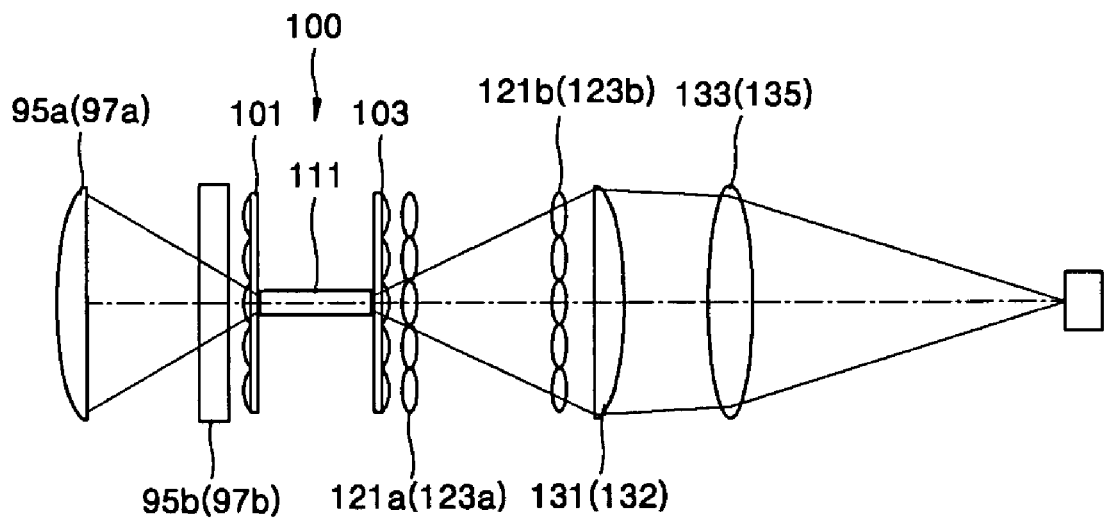
FIG. 9 is a view illustrating the horizontal axis ray tracing by the cylindrical lens pair of FIG. 3.

In FIGS. 3, 8, and 9, the scrolling unit 100 includes the two spiral lens discs 101 and 103 and the glass rod 111 arranged therebetween, in which the scrolling unit 100 may have a single spiral lens disc structure.

Also, an example in which the scrolling unit 100 is formed of a disc type is shown herein. The shape of the scrolling unit 100 may have various structures of having the lens cell formed to convert the rotation motion of the scrolling unit to a linear motion of the lens array. For example, the scrolling unit has a cylinder shape in which the lens cell is formed at an outer circumferential surface thereof so that the rotation motion thereof can be converted into the linear motion of the lens array.

Preferably, the lens cell 101a is formed to be spiral. In FIGS. 7 and 8, the scrolling unit 100 includes a plurality of lens cells 101a. Here, the lens cells 101a are formed at the identical interval and the sectional shapes of the lens cells 101a are preferably identical.

For example, the sectional shapes of the lens cells 101a are preferably cylindrical lens cells. Alternatively, the lens cells 101a can be formed of a diffractive optical device or a holographic optical element. Each of the lens cells 101a of the scrolling unit 100 functions as a condensing lens.

The color illuminating system according to the present invention preferably further includes a plurality of cylindrical lenses 95a and 95b, 97a and 97b, 131, and 132 in front of or in the rear of the scrolling unit 100.

The cylindrical lenses 95a and 95b are disposed on the proceeding path of light beam of the first color light group $L_A$. The cylindrical lenses 95A and 95B correct the shape of a beam by condensing the incident light beam of the first color light group $L_A$ in one direction and having the light transmit linearly in another direction. Thus, a beam having the shape corresponding to the effective area A indicated by a dotted line in FIG. 7 is incident on the scrolling unit 100.

Likewise, the cylindrical lenses 97a and 97b are disposed on the proceeding path of light beam of the second color light group $L_B$. The cylindrical lenses 97A and 97B correct the shape of a beam by condensing the incident light beam of the second color light group $L_B$ in one direction and having the light transmit linearly in another direction. Thus, a beam having the shape corresponding to the effective area B indicated by a dotted line in FIG. 7 is incident on the scrolling unit 100.

Also, the cylindrical lens 131 corrects the shape of the light beam of the first color light group $L_A$ passing through the effective area A of he scrolling unit 100 and separated by a fly eye lens array 121 which is described later. The cylindrical lens 132 corrects the shape of the light beam of the second color light group $L_B$ passing through the effective area B of the scrolling unit 100 and separated by a fly eye lens array 123 which is described later.

FIG. 9 shows a horizontal axis ray tracing by the pair of the cylindrical lenses 95a and 131 or 97a and 132.

The light beams of the first and second color light groups $L_A$ and $L_B$ passing through the cylindrical lenses 95a and 95b and the cylindrical lenses 97a and 97b, as shown in FIG. 7, are input to the first spiral lens disc 101 of the scrolling unit 100 by being separated from each other. The effective areas A and B where the light beams of the first and second color light groups $L_A$ and $L_B$ are radiated, respectively, have rectangular shapes.

The scrolling unit 100 periodically scrolls the color light beams separated by the color separating unit 70 by the rotation operation. The scrolling operation is described below in an example of the disc type scrolling unit 100 rotating clockwise at a predetermined speed.

The light beam of the first color light group $L_A$ separated by the color separating unit 70 experiences the beam correction as it passes through the cylindrical lenses 95a and 95b and then passes through the effective area A. Also, the light beam of the second color light group $L_B$ separated by the color separating unit 70 experiences the beam correction as it passes through the cylindrical lenses 97a and 97b and then passes through the effective area B.

Each array of the lens cells 101a seems to be a plurality of cylindrical lenses linearly arranged when viewed from a position of the effective area A. Since the array of the lens cells 101a is formed spirally, an effect of the cylindrical lenses continuously moving from the inner circumference to the outer circumference with respect to the rotation of the spiral lens disc 101 can be obtained. Thus, the color light beams of the first color light group $L_A$ incident on the effective area A are scrolled from the inner circumference to the outer circumference.

Also, in the effective area B, according to the same principle, the color light beams of the second color light group $L_B$ is scrolled. However, the directions of scrolling of the color light beams of the first and second color light groups $L_A$ and $L_B$ in the respective effective areas A and B are opposite to each other.

In the color illuminating system according to the present invention, a fly eye lens array 121, the cylindrical lens 131, and the relay lens 133 are further provided on the optical path of the light beam of the first color group $L_A$ having passed through the scrolling unit 100, in consideration of the shape of a color bar and the focal position of the light beam of the first color light group $L_A$. Also, considering the shape of the color bar and the focal position of the second color light group $L_B$, a fly eye lens array 123, the cylindrical lens 132, and the relay lens 135 are further provided on the optical path of the light beam of the second color group $L_B$ having passed through the scrolling unit 100.

The fly eye lens array 121 is arranged on the optical path of the light beam of the first color light group $L_A$ having passed through the second spiral lens disc 103 so that the light beams of the first color light group $L_A$ having passed through the scrolling unit 100 form color bars in different areas. To this end, the fly eye lens array 121 includes first and second fly eye lens arrays 121a and 121b having a plurality of convex portions formed on an incident surface and/or exit surface thereof in a 2-dimension array. The first and second fly eye lens arrays 121a and 121b are arranged close to each other. The first fly eye lens array 121a is preferably disposed on a focal plane of the second spiral lens disc 103. The convex portions of each of the first and second fly eye lens arrays 121a and 121b are formed to match one to one the lens cells 101a array of the first and second spiral lens discs 101 and 103 in the effective area A.

Thus, the color light beams belonging to the first color light group $L_A$ which is scrolled by the scrolling unit 100 transmit the first and second fly eye arrays 121a and 121b and are condensed at different positions for the respective color light beams, thus forming color bars in which the respective colors, for example, cyan and blue, are separated.

The fly eye lens array 123 is arranged on the optical path of the light beam of the second color light group $L_B$ emitted from the second spiral lens disc 103 so that the light beam of the second color light group $L_B$ which has passed through the scrolling unit 100 forms color bars in different areas. To this end, the fly eye lens array 123 includes the first and second fly eye lens arrays 123a and 123b having a plurality of convex portions formed on an incident surface and/or exit surface thereof in a 2 dimensional array. The first and second fly eye lens array 123a and 123b are arranged to neighbor each other. The first fly eye lens array 123a is preferably disposed on a focal plane of the second spiral lens disc 103. Also, the convex portion of each of the first and second fly eye lens arrays 123a and 123b is formed to match one to one the lens cells 101a array of the first and second spiral lens discs 101 and 103 in the effective area B.

Thus, the color light beams scrolled by the scrolling unit 100 and belonging to the second color light group $L_B$ are condensed at different positions for each color while transmitting the first and second fly eye lenses 123a and 123b, so that a color bar in which colors are separated, for example, color bars for red and green, is formed.

The cylindrical lens 131 corrects the shapes of the color light beams belonging to the first color light group $L_A$ which have transmitted the effective area A of the first spiral lens disc 101 and are condensed by the fly eye lens array 121 for each color.

The cylindrical lens 132 corrects the shapes of the color light beams belonging to the second color light group $L_B$ which have transmitted the effective area B of the first spiral lens disc 101 and are condensed by the fly eye lens array 123 for each color.

The relay lenses 133 and 135 transmit the light beams of the first and second color light groups $L_A$ and $L_B$ having passed through the fly eye lens arrays 121 and 123, to a predetermined position, for example, the position of the light valve. The relay lenses 133 and 135 make the color bars formed by the fly eye lens arrays 121 and 123 focused at a predetermined position, that is, on the light valve.

Here, each of the fly eye lens arrays 121 and 123, the cylindrical lenses 131 and 132, and the relay lenses 133 and 135 can be formed of a single device structure so as to be commonly applied to the light beams of the first and second color light groups $L_A$ and $L_B$, instead of being separately arranged on the proceeding paths of the light beams of the first and second color light groups $L_A$ and $L_B$.

The operation of the color illuminating system according to a preferred embodiment of the present invention having the above structure is described below with the optical configuration shown in FIGS. 3 through 5 and FIGS. 7 through 9.

The white light beam emitted from the light source 60 is changed to a parallel beam or a divergent beam close to a parallel beam by being condensed by the first collimating lens 71, while the diameter of the light beam is reduced. The white light beam is changed to have one polarization by the polarization conversion system 72 and input to the rod type color separating unit 70.

The white light beam input to the color separating unit 70 is separated into the first through fourth color light beams $L_1$, $L_2$, $L_3$ and $L_4$. The first color light group $L_A$ including the first and second color light beams $L_1$ and $L_2$ and the second color light group $L_B$ including the third and fourth color light beams $L_3$ and $L_4$ are separated from each other by the optical block 87 of the color separating unit 70 to avoid the area where the driving source 105 is arranged and the light beams of the first and second color light groups $L_A$ and $L_B$ can be radiated in the effective areas A and B of the first spiral lens disc 101. The light beams of the first and second color light groups $L_A$ and $L_B$ are changed to have polarization different from each other by the polarization changer 88 disposed between the second dichroic mirror surface 82 and the third dichroic mirror surface 84.

The light beams of the first and second color light groups $L_A$ and $L_B$ which are emitted from the color separating unit 70, and the same divergent angles and beam diameters of which are restored by the relay lenses 89a, 89b, 89c, and 89d to those of the light beam emitted from the light source 60, are shaped by the cylindrical lenses 95a, 95b, 97a, and 97b, to predetermined shapes, and then incident on the effective areas A and B of the first spiral lens disc 101.

The scrolling unit 100 is rotated by the driving source 105 so that the light beams of the first and second color light groups $L_A$ and $L_B$ incident on the effective areas A and B are scrolled by the rotation of the scrolling unit 100. The scrolled light is condensed by the lens cells 101$a$ array and divided into various optical paths for each color. The divided light beams pass the fly eye lens arrays 121 and 123, the cylindrical lenses 131 and 132, and the relay lenses 133 and 135 and form a color bar at the divided predetermined position.

The cyan and blue bars formed with respect to the light beam of the first color group $L_A$ having passed through the effective area A is scrolled, for example, from the upside to the downside on the drawing. The red and green bars formed with respect to the light beam of the second color group $L_B$ having passed through the effective area B is scrolled, for example, from the upside to the downside on the drawing. That is, the light beam of the first color light group $L_A$ having passed through the effective area A and the light beam of the second color light group $L_B$ having passed through the effective area B are scrolled in the opposite directions.

Figure 10:
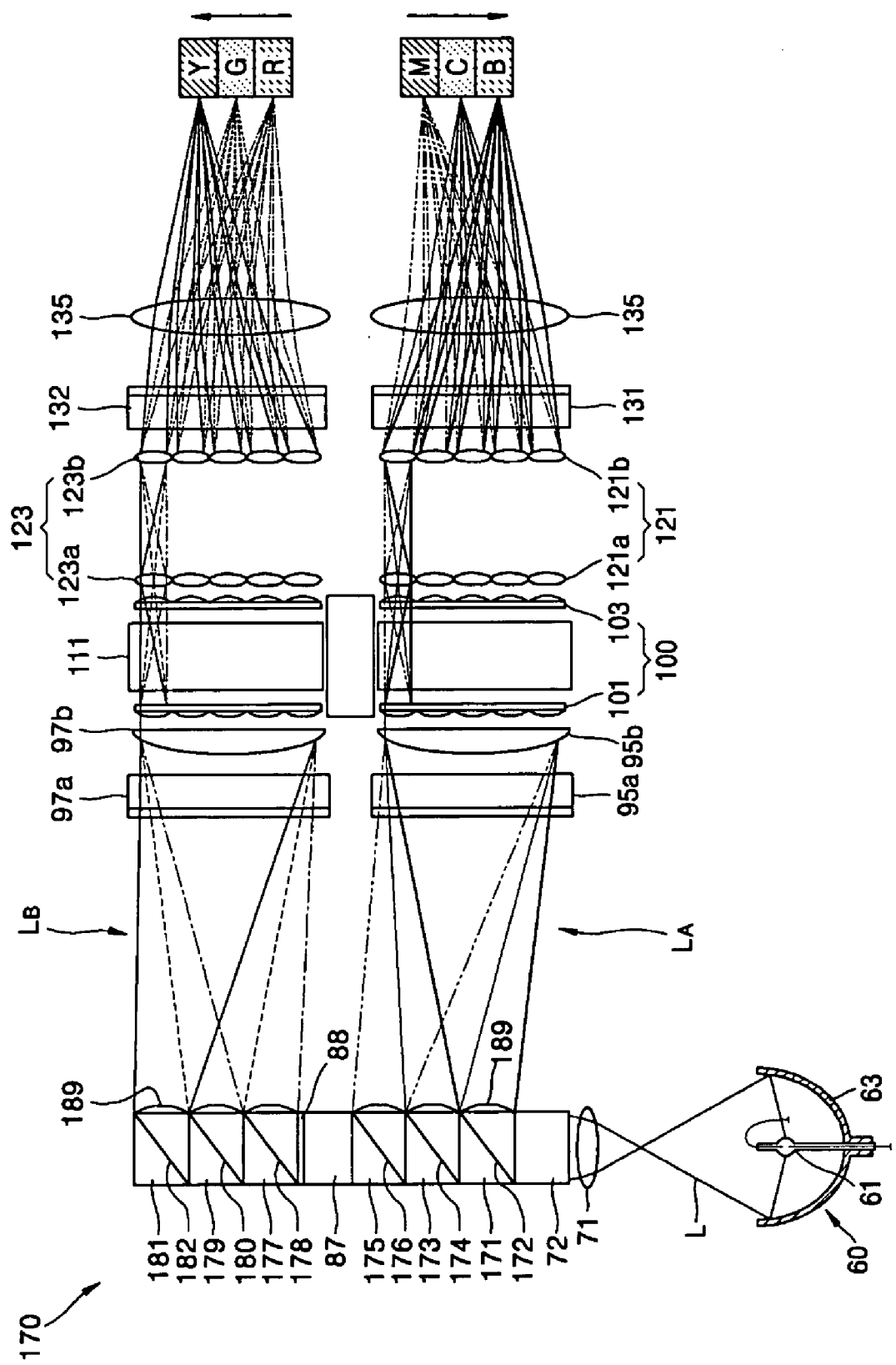
FIG. 10 is a view illustrating the optical configuration of a color illuminating system according to another preferred embodiment of the present invention.

FIG. 10 shows a color illuminating system according to another preferred embodiment of the present invention. The optical configuration except for a rod type color separating unit 170 is substantially the same as or similar to that of the color illuminating system according to the above-described preferred embodiment of the present invention shown in FIG. 3 through 9. Thus, any optical parts having the same functions as or similar to those in the previous preferred embodiment will be omitted.

Referring to FIG. 10, in the color illuminating system according to another preferred embodiment of the present invention, the rod type color separating unit 170 is characteristically separate the white light beam output from the light source 60 into 6 color light beams in two color light groups.

The rod type color separating unit 170 includes 6 dichroic mirror surfaces 172, 174, 176, 178, 180, and 182 which reflect particular color light beams. As shown in FIG. 9, the color separating unit 170 includes first through sixth dichroic prisms 171, 173, 175, 177, 179, and 181 having the dichroic mirror surfaces 172, 174, 176, 178, 180, and 182, and can be formed as a rod type structure. A relay lens 189 is arranged at an output end of each of the first through sixth dichroic prisms 171, 173, 175, 177, 179, and 181. The relay lens 189 is substantially the same as that of the relay lenses 89 of FIG. 3.

The dichroic mirror surfaces 172, 174, 176, 178, 180, and 182 of the first through sixth dichroic prisms 171, 173, 175, 177, 179, and 181, from the side close to the light source 60, are provided to reflect, for example, a blue beam B, a cyan beam C, a magenta light beam M, a red beam R, a green beam G, and a yellow beam Y, respectively.

As shown in FIG. 10, for example, the optical block 87 may be disposed between the dichroic mirror surface 176 and the dichroic mirror surface 178 such that the blue beam B, the cyan beam C, and the magenta light beam M are included in the first color light group $L_A$ while the red beam R, the green beam G, and the yellow beam Y are included in the second color light group $L_B$. Also, as shown in FIG. 10, for example, the polarization changer 88 may be provided at the color separating unit 170 so that the color light beams included in the first and second color light groups $L_A$ and $L_B$ have different polarizations.

As shown in FIG. 10, when the polarization changer 88 is provided in the color separating unit 170, the light beams of the first and second color light groups $L_A$ and $L_B$ have different polarizations. The number and position of the polarization changer 88 can be varied as described above.

The number of the color light beams included in each of the first and second color light groups $L_A$ and $L_B$ can be varied in a range such that at least one color light is included in one of the first and second color light groups LA and LB and at least one color light is included in the other of the first and second color light groups $L_A$ and LB.

As shown in FIG. 10, when the first color light group $L_A$ includes the blue beam B, the cyan beam C, and the magenta light beam M and the second color light group $L_B$ includes the red beam R, the green beam G, and the yellow beam Y, the first and second color light groups $L_A$ and $L_B$ are appropriately separated from each other, and the light beams of the first and second color light groups $L_A$ and $L_B$ are radiated in the effective areas A and B of FIG. 5 of the first spiral lens disc 101, the color bar formed with respect to the color light beams included in the first color light group $L_A$ and the color bar formed with respect to the color light beams included in the second color light group $L_B$ are scrolled in the opposite directions by the scrolling of the scrolling unit 100.

In addition to the above-described preferred embodiments, the color separating unit according to the present invention and the color illuminating system having the same can be variously modified to be capable of driving multichannels so long as the Etendue of an optical system such as 5 color light beams scrolling, for example, 2 color light beams and 3 color light beams are included in the respective color light groups, 7 color light beams scrolling and 8 color light beams scrolling, which are formed of two color light groups, is also permitted.

In the color separating unit according to the present invention and the color illuminating system having the same, the incident white light beam may be separated into three color light beams and two color light beams are included in one color light group and one color light is included in the other color light group. Also, the color separating unit may include three dichroic mirror surfaces, one optical block, and at least one polarization changer so that the color light beam and the other color light beams have different polarizations. Thus, the white light beam may be separated into three color light beams in two color light groups and the light beams of the two color light groups are scrolled.

In the above descriptions and illustrations, the color illuminating system according to the present invention includes a single spiral lens disc and the light beams of the two color light groups are scrolled in the opposite directions. However, as shown in the following description regarding a projection type image display apparatus of FIG. 14 which uses the color illuminating system according to the present invention, a pair of spiral lens discs arranged parallel to each other to scroll each of the light beams of the two color light groups so that the light beams of the two color light groups can be scrolled in the same direction.

Also, as shown in the following description regarding a projection type image display apparatus of FIG. 16 which uses the color illuminating system according to the present invention, the color illuminating system according to the present invention may be configured to increase the intensity of light such that the light beams from two independent light sources are separated into two color light groups by using a single color separating unit and incorporated by a polarizing beam splitter so that the light beams are modulated by each of light valves.

Hereinafter, preferred embodiments of the projection type image display apparatus having the color illuminating system according to the present invention are described in detail.

The projection type image display apparatus according to the present invention, as shown in FIGS. 11, 12, 14, and 16, includes a color illuminating system having a variety of configurations as described above, which uses the color separating unit according to the present invention to separate the incident white light beam into a plurality of color light beams, preferably, 4 or more color light beams, and radiate the separated color light beams, and at least one light valve 157 and 159 to form an image by controlling the radiated color light beams in the unit of pixel according to an input image signal. The image generated by the light valve 157 and 159 is magnified by a projection lens unit 270 and projected onto a screen 280.

Figure 11:
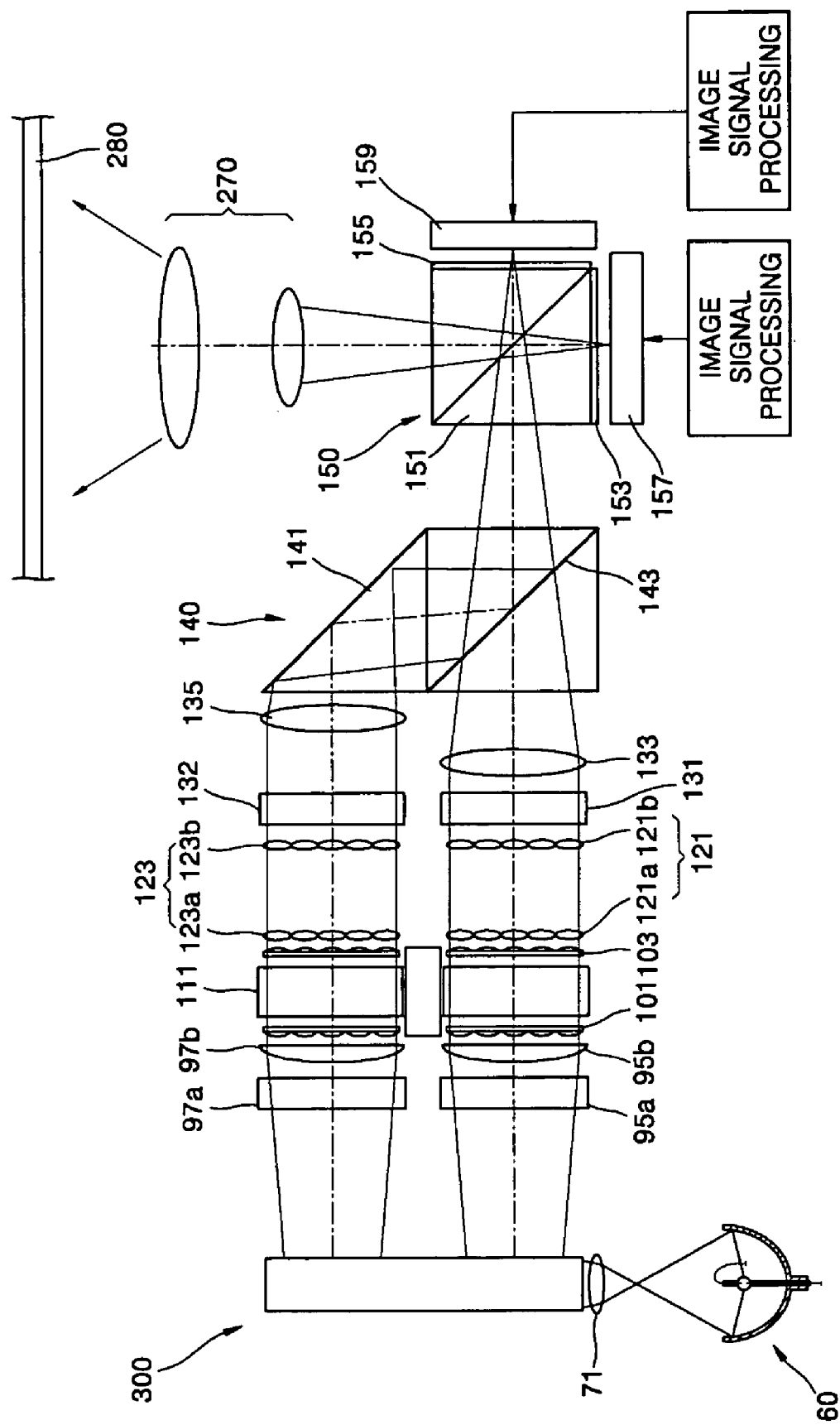
FIG. 11 is a view illustrating the optical configuration of a projection type image display apparatus according to a first preferred embodiment of the present invention.

Referring to FIG. 11, an image display apparatus according to a first preferred embodiment of the present invention includes a color illuminating system radiating a plurality of separated color light, further preferably, four or more separated color light beams, the first and second light valves 157 and 159 forming an image by controlling the radiated color light beams in the unit of pixel according to the input image signal, and an image combiner 150 combining the images generated by the first and second light valves 157 and 159 to proceed the combined image toward the projection lens unit 270. Also, preferably, the image display apparatus according to the preferred embodiment of the present invention further includes an optical unit 140 to combine the proceeding paths of the light beams of the first and second color light groups $L_A$ and $L_B$.

The color illuminating systems according to various preferred embodiment of the present invention can be employed as the color illuminating system. FIG. 11 shows the case in which the color illuminating system has the optical configuration of FIGS. 3 through 10. In FIG. 11, reference numeral 300 denotes a color separating unit. The color separating system 300 includes the color separating unit according to the present invention, the relay lenses 89, and the polarization conversion systems 72 and 73, which separate the white light beam emitted from the light source 60 into a plurality of color light beams, preferably, four color light beams, so that two color light groups $L_A$ and $L_B$, each having at least one of the separated color light beams, are separated from each other.

The number of the dichroic mirror surface forming the color separating unit according to the present invention, the separation structure of the two color light groups, the number of the relay lenses 89 provided corresponding to the number of the dichroic mirror surface and/or the arrangement of at least one polarization changer to make two types of the polarization of the separated color light beams can be diversely modified. Thus, in order to include all of such diversity in the projection type image display deices according to the present and other preferred embodiments having the color illuminating system according to the present invention, the configuration including the color separating unit, the relay lens, and the polarization conversion system is simply represented as the color separating system 300.

The optical unit 140 includes a first reflection surface 141 reflecting light beam of one of the first and second color light groups $L_A$ and $L_B$ and a second reflection surface 143 selectively transmitting and reflecting the light beam of one color light group reflected by the first reflection surface 141 and light beam of the other color light group to combine the transmitted and reflected light beams.

When the polarizations of the light beams of the first and second color light groups $L_A$ and $L_B$ emitted from the color separating system 300 of the color illuminating system are different from each other, the first and second reflection surfaces 141 and 143 are preferably polarizing beam splitter surface so that the first reflection surface 141 totally reflects the light beam of the second color light group $L_B$ and the second reflect surface 143 reflects the light beam of the second color light group $L_B$ and transmits the light beam of the first color light group $L_A$.

As shown in FIG. 11, since there is a difference between the lengths of the optical paths of the light beams of the first and second color light groups $L_A$ and $L_B$ passing through the optical unit 140, the relay lenses 133 and 135 are preferably provided to correct the difference in the length of the optical path.

That is, as shown in FIG. 11, the difference between the lengths of the optical paths of the light beams of the first and second color light groups $L_A$ and $L_B$ passing in the optical unit 140 can be compensated by optimally adjusting the arrangement positions of the relay lenses 133 and 135. That is, when the difference between the lengths of the optical paths is corrected by appropriately arranging the relay lenses 133 and 135, the focal positions of the light beams of the first and second color light groups $L_A$ and $L_B$ condensed by the relay lenses 133 and 135 become the same.

The first and second color light groups $L_A$ and $L_B$, of which the proceeding paths are combined by the optical unit 140, pass through the image combiner 150 and are radiated on the first and second light valves 157 and 159.

For example, the light beam of the first color light group $L_A$ is reflected by the polarizing beam splitter 151 to be radiated to the first light valve 157 while the light beam of the second color light group $L_B$ is reflected by the polarizing beam splitter 151 to be radiated to the second light valve 159. In this case, the first light valve 157 forms a color image to the color light beam of the first color light group $L_A$ while the second light valve 159 forms a color image to the color light beam of the second color light group $L_B$.

For example, when the first color light group $L_A$ includes the cyan beam C and the blue beam B while the second color light group $L_B$ includes the red beam R and the green beam G, the first light valve 157 forms cyan and blue images according to B and C signal processing for forming blue and cyan images and the second light valve 159 forms red and green images according to R and G signal processing for forming red and green images.

The cyan beam C and the blue beam B are radiated onto the first light valve 157 in the form of a color bar and are scrolled according to the rotation of the first spiral lens disc 101. The red beam R and the green beam G are radiated onto the second light valve 159 in the form of a color bar and are scrolled according to the rotation of the first spiral lens disc 101. A color image for each color is formed by processing image information with respect to each pixel of the first and second light valves 157 and 159 synchronized with the movement of the color bar for each color by the scroll operation.

The first and second light valves 157 and 159 are disposed at positions where the scrolling color bar is formed. Preferably, reflective light valves, for example, reflective LCD devices, are provide as the first and second light valves 157 and 159. The reflective LCD devices reflect the incident beam and change the polarization thereof according to the image signals in the unit of pixel.

When reflection type LCD devices are used as the first and second light valves 157 and 159, since the generation of an image is represented by a change of the polarization of a light beam in the unit of pixel, the images generated by the first and second light valves 157 and 159 can be combined by the image combiner 150 which includes the polarizing beam splitter 151 and a pair of the wave plates 153 and 155 functioning as quarter wave plates.

It is assumed that the light beams of the first and second color light groups $L_A$ and $L_B$ output from the optical unit 140 and input to the image combiner 150 have an S polarization and a P polarization, respectively, and that the polarizing beam splitter 151 of the image combiner 150 reflects the S polarization and transmits the P polarization.

In this case, the light beam of the first color light group $L_A$ having an S polarization is reflected by the polarizing beam splitter 151. The polarization of the light is changed to a substantially circular polarization by the wave plate 153 and condensed on the first light valve 157. Among the light modulated (polarization-changed) according to the image signals in the unit of pixel by the first light valve 157 and reflected, only the light, whose polarization is changed to a P polarization while the light beam passes through the wave plate 153, transmits through the polarizing beam splitter 151 and proceeds toward the projection lens unit 270.

The light beam of the second color light group $L_B$ having a P polarization transmits through the polarizing beam splitter 151. The polarization of the light is changed to a substantially circular polarization by the wave plate 155 and condensed on the second light valve 159. Among the light modulated (polarization-changed) according to the image signals in the unit of pixel by the second light valve 159 and reflected, only the light, whose polarization is changed to an S polarization while the light beam passes through the wave plate 155, is reflected by the polarizing beam splitter 151 and proceeds toward the projection lens unit 270.

Thus, the light modulated according to the image signals by the first and second light valves 157 and 159 are combined while passing through the respective wave plates 153 and 155 and the polarizing beam splitter 151 of the image combiner 150, and projected onto the screen 280 by the projection lens unit 270.

In FIG. 11, the image combiner 150 consists of the polarizing beam splitter 151 and the wave plates 153 and 155. The structure of the image combiner 150 may vary according to the characteristic of the reflection type LCD device used as the first and second light valves 157 and 159 in the image display apparatus according to the present invention. For example, when a reflection type LCD device which generates an image by a degree of changing the light beam of the first color light group $L_A$ of an S polarization into a light beam of a P polarization is used as the first light valve 157, there is no need to use the wave plate 153. Likewise, when a reflection type LCD device which generates an image by a degree of changing the light beam of the second color light group $L_B$ of a P polarization into a light beam of an S polarization is used as the second light valve 159, there is no need to use the wave plate 153. That is, due to the characteristic of the reflection type LCD device used as the first and second light valves 157 and 159, the image combiner 150 may not need the wave plates 153 and 155.

The projection lens unit 270 is arranged between the image combiner 150 and the screen 280 to magnify and project an incident image toward the screen 280.

As shown in FIG. 11, when the light beams of the first and second color light groups $L_A$ and $L_B$ are radiated in the two effective areas A and B of the scrolling unit 100 and scrolled in the opposite directions and the optical unit 140 simply combines the optical paths without reversing the scroll directions, since the scroll directions of the color bars radiated onto the first and second light valves 157 and 159 are opposite to each other, an image for each color is generated considering the difference in the scroll directions.

As described above, in the projection type image display apparatus adopting the color illuminating system according to the present preferred embodiment of the present invention, since four color light beams, for example, are divided into a P polarization color light group and an S polarization color light group such that two color light beams are transmitted to two reflection type light valves, the Etendue burden due to the color light separation can be reduced. Also, since the respective color light beams are scrolled by the rotation of the scrolling unit 100 and mixed on the screen, an efficiency in use of light is doubled. Furthermore, since the scroll of two color light beams is performed in each of the two effective areas A and B of the scrolling unit 100, a compact color illuminating system and a compact image display apparatus can be embodied.

In the projection type image display apparatus according to the present preferred embodiment of the present invention, since two reflection type light valves 157 and 159 are used, the respective color light components can be changed to have desired polarizations. Also, since the color light separation is performed with respect to each of the polarizations and the parallel beam (in which the incident angle is 0), the color separating unit can be easily manufactured and color purity can be increased accordingly.

Figure 12:
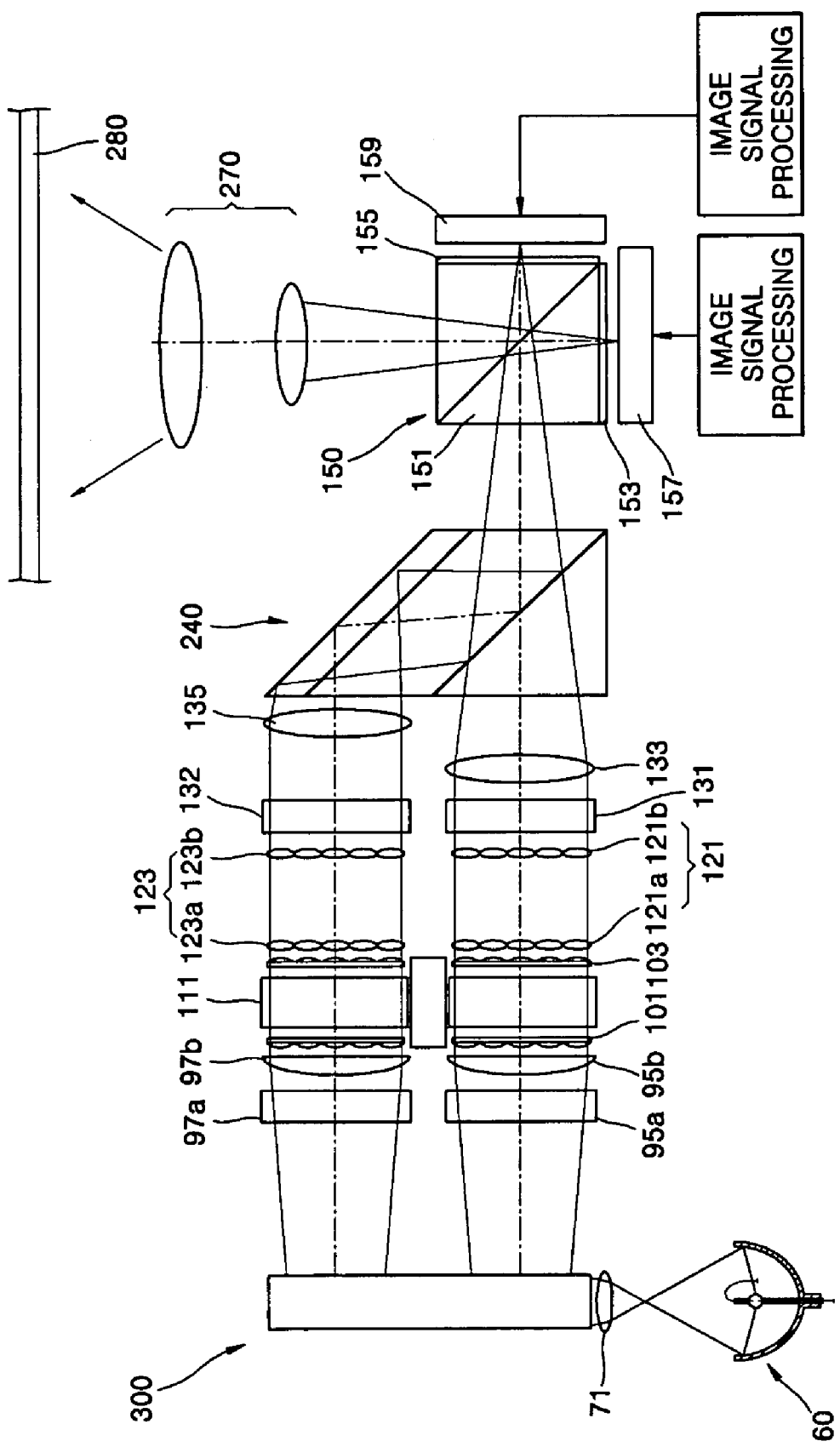
FIG. 12 is a view illustrating the optical configuration of a projection type image display apparatus according to a second preferred embodiment of the present invention.

FIG. 12 shows a projection type image display apparatus according to a second preferred embodiment of the present invention. In the projection type image display apparatus according to the second preferred embodiment of the present invention, the light beams of the first and second color light groups $L_A$ and $L_B$ are radiated in the two effective areas A and B of the scrolling unit 100 and scrolled in the opposite directions. The optical unit 240 changes, for example, the scroll direction of the light beam of the second color light group $L_B$ so that the scroll directions of the light beams of the first and second color light groups $L_A$ and $L_B$ are the same and combines the proceeding paths of the light beam of the first and second color light groups $L_A$ and $L_B$.

The optical unit may be a scroll changing prism to change the scroll direction so that the scroll directions of the light beams transmitting each of the scrolling unit 100 and the first and second effective areas A and B are the same.

The scroll direction prism 240 preferably changes the scroll direction by reversing the scroll direction of the color bar with respect to the light beam of one of the first and second color light groups $L_A$ and $L_B$ through reflection process and combines the proceeding paths of the light beams of the first and second color light groups $L_A$ and $L_B$ by selectively transmitting and reflecting the light beam of the color light group having the scroll changed by the reflection process and the light beam of the other color light group.

The scroll direction prism 240 preferably has the shape of an Amichi prism.

Figure 13:
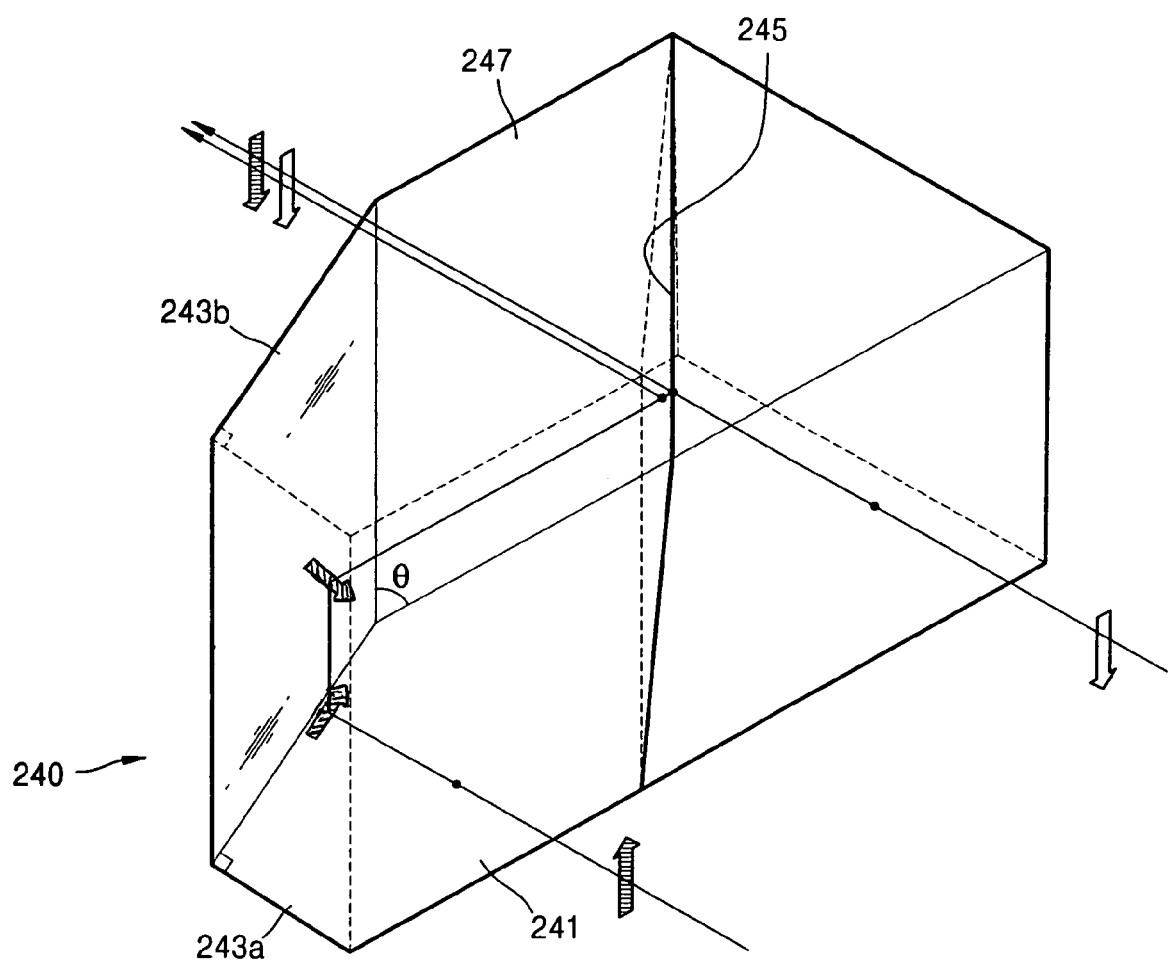
FIG. 13 is a perspective view illustrating the scroll conversion prism of FIG. 12.

Referring to FIG. 13, the scroll direction prism 240 having the Amichi prism shape includes an incident surface 241, an exit surface 247, reflection surfaces 243a and 243b arranged at a right angle each other and inclined by an angle θ from the incident surface 241 toward the exit surface 247, and a reflection surface 245 reflecting the light reflected by the reflection surfaces 243a and 243b to proceed toward the exit surface 247.

Thus, when the light having a scroll direction as indicated by an arrow in one direction is input through the incident surface 241, while the up/down direction of the incident light does not change, the incident light proceeds toward the reflection surface 245 by the reflection surfaces 243a and 243b which is arranged to be inclined by the angle θ.

The left/right direction of the incident light are changed by the reflection surfaces 243a and 243b. That is, the light incident on the reflection surface 243a is reflected to proceed toward the reflection surface 243b. Then, the light reflected by the reflection surface 243b proceeds again toward the reflection surface 245. Likewise, the light incident on the reflection surface 243b is reflected by the reflection surface 243a and proceeds toward the reflection surface 245. Thus, the scroll direction is changed as indicated by an arrow on the drawing.

The reflection surface 245 is arranged on one surface of the scroll direction prism 240 to reflect light beam of one color light group which is input with a changed scroll direction and transmit the light beam of the other color light group. Thus, the optical paths of the light beams of the first and second color light groups $L_A$ and $L_B$ transmitting the effective areas A and B are combined.

When the light beams of the first and second color light groups $L_A$ and $L_B$ have different polarizations, the reflection surface 245 is preferably formed as a polarizing beam splitter surface to selectively transmit or reflect the incident light according to the polarization direction.

In this case, for example, the scroll direction of the light beam of the second color light group $L_B$ having a P polarization is changed by the reflection surfaces 243a and 243b and the light proceeds to the reflection surface 245 and is reflected thereby. Meanwhile, the light beam of the first color light group $L_A$ having an S polarization transmits the reflection surface 245 and proceeds in the same direction as the light beam of the second color light group $L_B$. The scroll direction prism 240 can have a pentaprism shape.

When the scroll direction prism 240 is provided as the optical unit 240 to combine the optical paths of the light beams of the first and second color light groups $L_A$ and $L_B$, the scroll directions of the color bars radiated on the first and second light valves 157 and 159 are the same. Thus, in this case, since the difference in the scroll direction needs not be taken into consideration, driving a screen is made easier.

Figure 14:
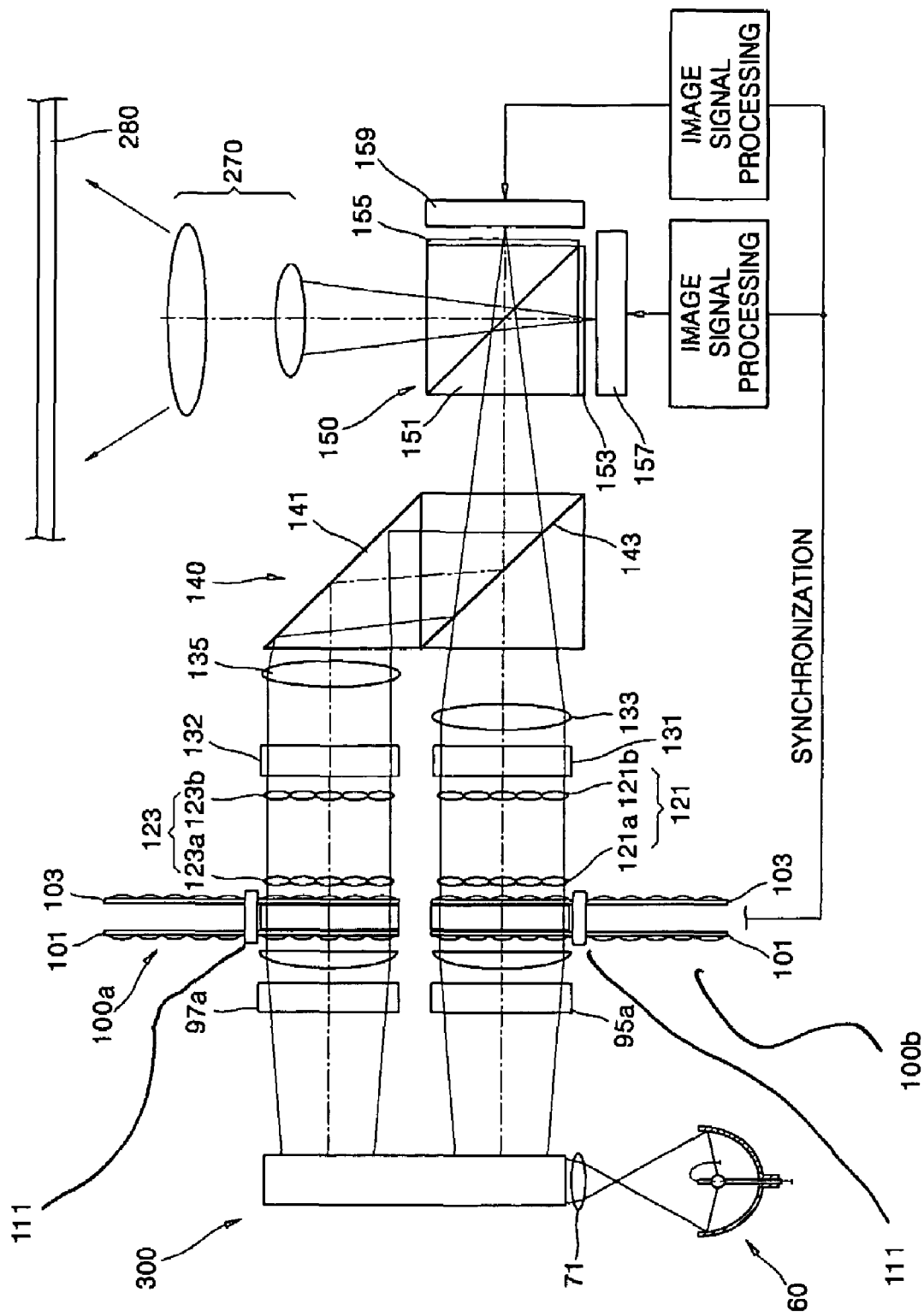
FIG. 14 is a view illustrating the optical configuration of a projection type image display apparatus according to a third preferred embodiment of the present invention.

FIG. 14 shows a projection type image display apparatus according to a third preferred embodiment of the present invention. Compared with the image display apparatus according to the first preferred embodiment of the present invention, the image display apparatus according to the third preferred embodiment of the present invention characteristically includes a pair of scrolling units 100a and 100b provided parallel to each other to scroll the light beam of the first and second color light groups $L_A$ and $L_B$. FIG. 15 shows the incident areas and the scroll directions of the light beams of the first and second color light groups $L_A$ and $L_B$ which are incident on each of the first spiral lens discs 101 of a pair of the scrolling units 100a and 100b. In FIG. 15, reference letters C and D denote effective areas on which the light beams of the first and second color light groups $L_A$ and $L_B$ are incident, respectively. In FIGS. 14 and 15, the optical elements having the same functions as or similar to those of the above-described preferred embodiments have the same reference numerals and detailed descriptions thereof are omitted herein.

The scrolling units 100a and 100b have substantially the same structure as that of the scrolling unit 100 in the above preferred embodiment, except for a glass rod 111. Referring to FIG. 15, when the scrolling units 100a and 100b are used, each of the scrolling units 100a and 100b has the glass rod 111 that is provided on each of the proceeding paths of the first and second color light groups $L_A$ and $L_B$ between the first and second spiral lens discs 101 and 103. Thus, each of the scrolling units 100a and 100b has only one glass rod 111 unlike the scrolling unit 100 having two glass rods 111.

Figure 15:
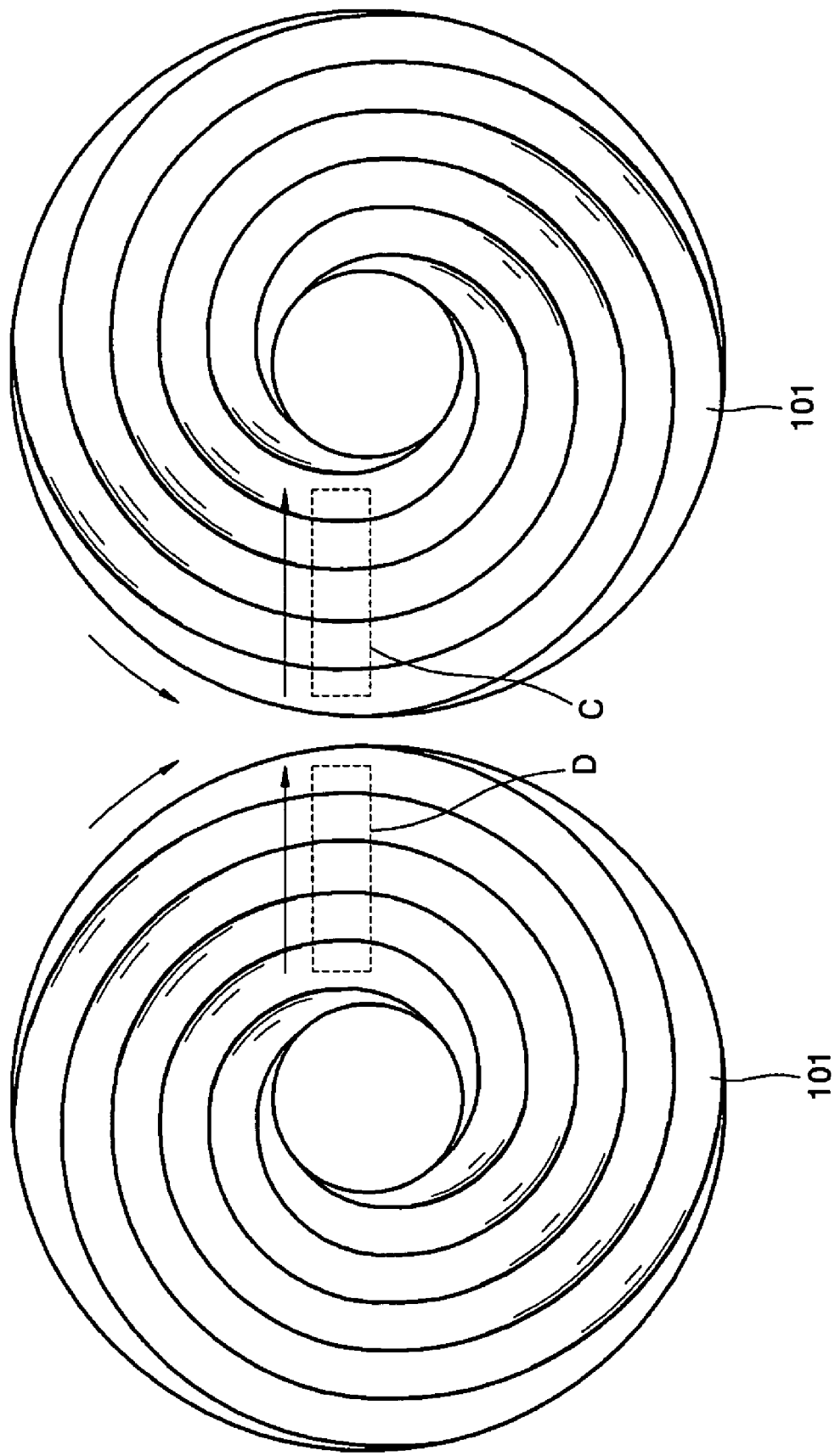
FIG. 15 is a plan view illustrating the spiral lens disc of FIG. 14.

As shown in FIGS. 14 and 15, by providing a pair of the scrolling units 100, the light beams of the first and second color light groups $L_A$ and $L_B$ are independently driven and scrolled and the rotation directions of the two scrolling units 100 can be independently controlled, it is possible to make the scroll directions of the light beams of the first and second color light groups $L_A$ and $L_B$ the same.

When the effective areas C and D where the light beams of the first and second color light groups $L_A$ and $L_B$ are incident are the areas of the first spiral lens disc 101 that are close to each other, as shown in FIG. 15, and the scrolling units 100a and 100b are rotated in the opposite direction, the scrolling directions of the light beams of the first and second color light groups $L_A$ and $L_B$ can be made the same.

In FIG. 15, the disc 101 of the scrolling unit 100a is rotated counterclockwise so that a plurality of cylindrical lenses in the effective area C are continuously moved from the outer circumference of the scrolling unit 100a to the inner circumference thereof. The disc 101 of the scrolling unit 100b is rotated clockwise so that a plurality of cylindrical lenses in the effective area D are continuously moved from the inner circumference of the scrolling unit 100b to the outer circumference thereof. By changing the rotation directions of the two scrolling units 100a and 100b to be opposite to each other, the scroll directions can be reversed.

When the light beams of the first and second color light groups $L_A$ and $L_B$ are scrolled by the different scrolling units 100a and 100b, the scroll directions are the same so that the scroll directions of the color bars of the first and second color light groups $L_A$ and $L_B$ are made the same.

Here, since the two scrolling units 100a and 100b are used, the driving of the two scrolling units 100a and 100b, a B and C signal processing to generate, for example, blue and cyan images in the first light valve 157, and an R and G signal processing to generate, for example, red and green images in the second light valve 159, are preferably synchronized as shown in FIG. 14.

Although FIG. 14 shows an example in which the image display apparatus according to the third preferred embodiment includes the optical unit 140 that is the same as that of the first preferred embodiment of the present invention, it is possible to include an optical unit of the image display apparatus according to the second preferred embodiment of the present invention, that is, the scroll change prism 240, instead of the optical unit 140.

In the above descriptions and the accompanying drawings, the projection type image display apparatus according to the present invention is described and illustrated as one having a single light source. The projection type image display apparatus according to the present invention, as shown in FIG. 16, preferably includes a pair of light sources 60 radiating light to input ends at both ends of a color separating unit 500 and a pair of collimating lenses 71, so that light can be input from both sides of the color separating unit 500. In this case, the color separating unit 500 preferably includes the polarization conversion system and a plurality of the relay lenses arranged at the input end of both sides of the color separating unit.

The color separating unit 500 includes a plurality of first dichroic mirror surfaces to separate light output from one of the light sources 60 into a plurality of color light beams and a plurality of second dichroic mirror surfaces to separate light output from the other light source 60 into a plurality of color light beams. The arrangement directions of the first and second dichroic mirror surfaces are opposite to each other and an optical block is provided between the first and second dichroic mirror surfaces.

Since the structure of the color separating unit 500 can be sufficiently assumed from the above description, detailed description and illustration thereof will be omitted.

A projection type image display apparatus according to a fourth preferred embodiment of the present invention may include the same optical configuration as one of the image display apparatuses according to the first through third preferred embodiments of the present invention, except for a pair of the light sources, a pair of the collimating lenses, and the color separating unit 500. In FIG. 16, an example of adopting the optical configuration of the image display apparatus according to the second preferred embodiment of the present invention is shown.

Figure 16:
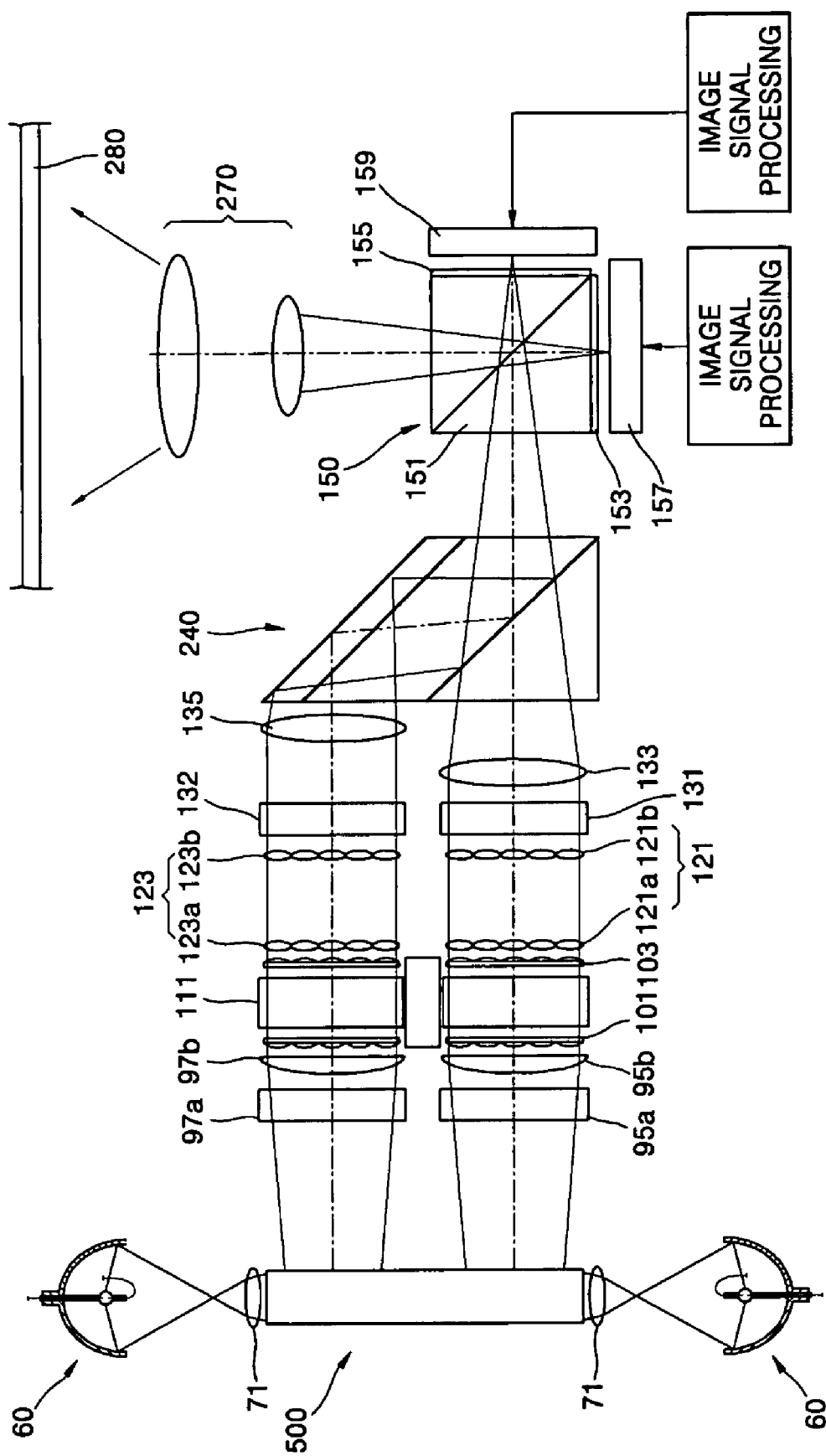
FIG. 16 is a view illustrating the optical configuration of a projection type image display apparatus according to a fourth preferred embodiment of the present invention.

As shown in FIG. 16, the light beams of the two independent light sources 60 are separated into two color light groups by using a single color separating unit and combined by the image combiner 150, and the light beams are modulated by the first and second light valves 157 and 159, so that the intensity of the light can be doubled.

While this invention has been particularly shown and described with reference to preferred embodiments thereof, it will be understood by those skilled in the art that various changes in form and details may be made therein without departing from the spirit and scope of the invention as defined by the appended claims.

Figure 17:
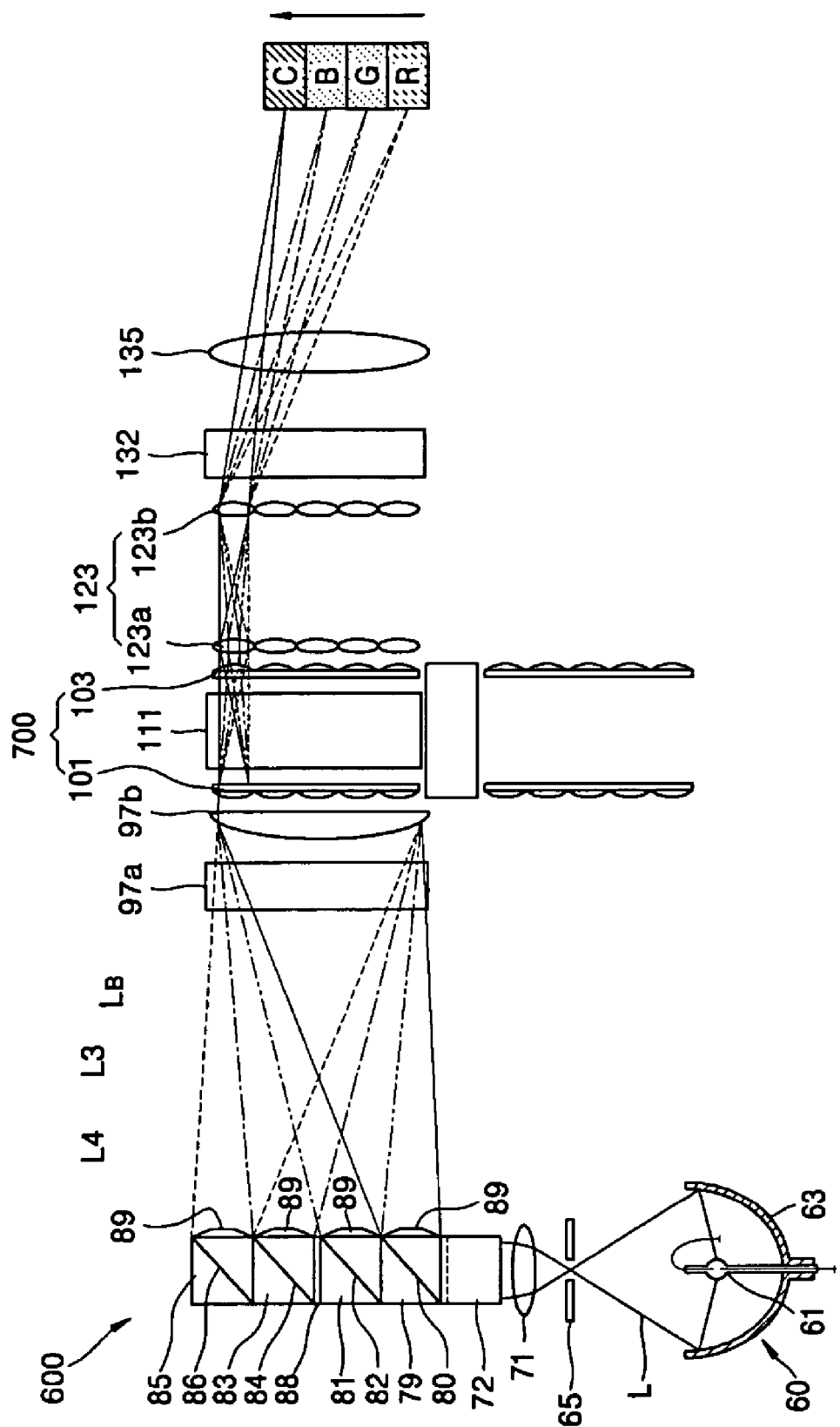
FIG. 17 is a view illustrating the optical configuration of a color illuminating system according to yet another preferred embodiment of the present invention.

As described above, in the color illuminating system and the projection type image display apparatus according to the present invention employing the same, instead of separating the light beam emitted from the light source into the two color light groups $L_A$ and $L_B$, as shown in FIG. 17, the color separating unit is configured to make the separated color light beams to be incident on the same effective area of the scrolling unit 700 and the remaining optical system can be configured corresponding thereto.

Figure 18:
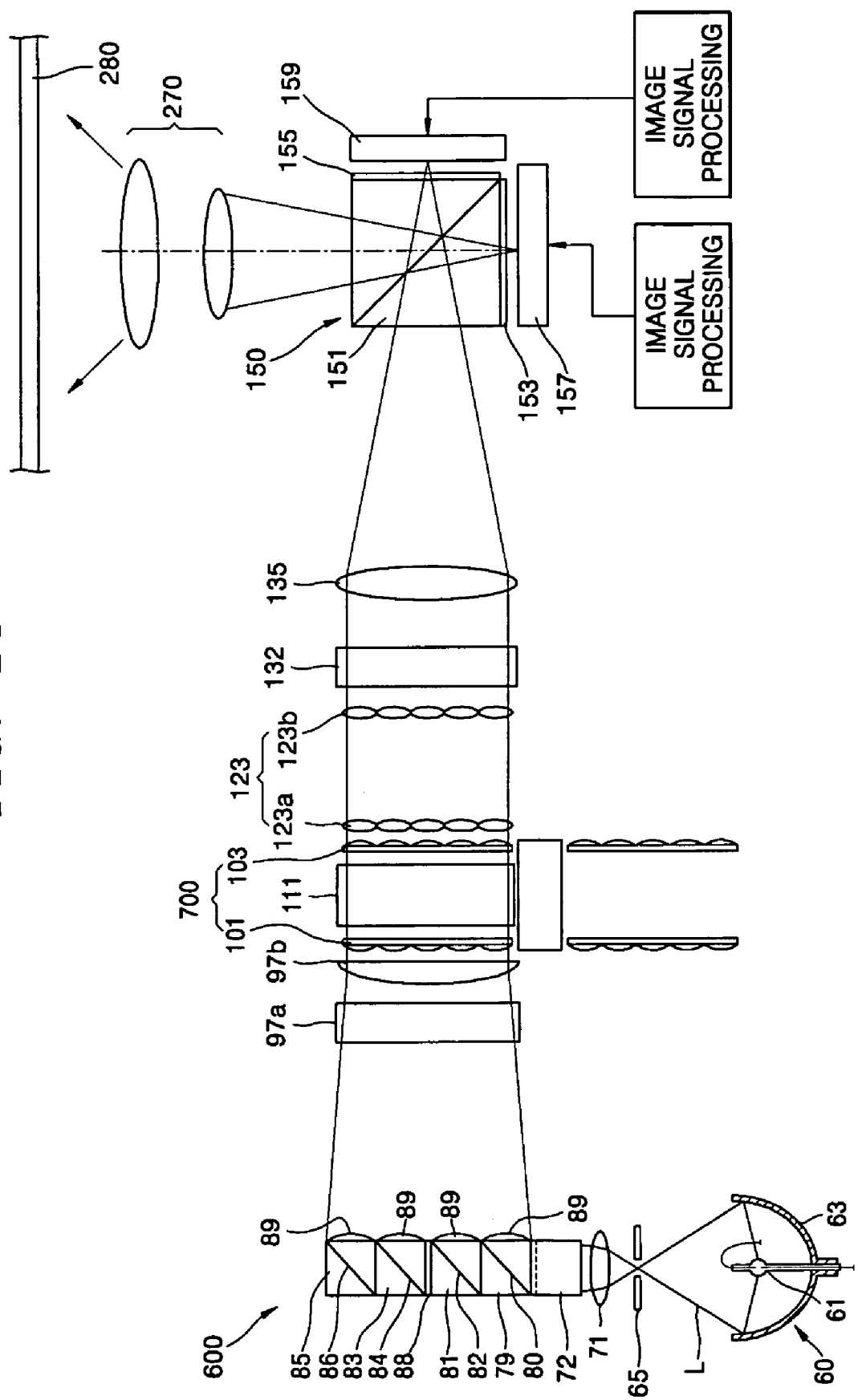
FIG. 18 is a view illustrating the optical configuration of a projection type image display apparatus according to a fifth preferred embodiment of the present invention.

FIG. 17 schematically shows the optical configuration of a color illuminating system according to yet another preferred embodiment of the present invention. FIG. 18 schematically shows the optical configuration of a projection type image display apparatus according to a fifth preferred embodiment of the present invention employing the color illuminating system of FIG. 17.

In FIG. 17, a color illuminating system includes a color separating unit 600 to separate the light beam emitted from the light source 60 into a plurality of color light beams, that is, 3 through 8 color light beams, and a scrolling unit 700 to embody color scrolling. Here, the elements having the same functions as or similar to those of the above-described preferred embodiments are indicated by the same reference numerals so that detailed descriptions thereof will be omitted herein.

The color separating unit 600 is preferably provide to separate a white light beam emitted from the light source 60 into 4 or more color light beams.

Compared with the color separating units 70, 70', or 170 in the above-described preferred embodiments, the color separating unit 600 has no optical block to separate the color light beams while the other parts are substantially the same as those of the color separating units 70, 70', and 170 of the previous preferred embodiments.

For example, the color separating unit 600, as shown in FIG. 17, forms a rod type mono body and includes first through fourth dichroic prisms 79, 81, 83, and 85 respectively having first through fourth dichroic mirror surface 80, 82, 84, and 86 to reflect different color light beams and at least one polarization changer 88 to make at least one color light beam and the other color light beams of the color light beams separated by the first through fourth dichroic mirror surfaces 80, 82, 84, and 86, have different polarizations.

In FIGS. 17 and 18, a single polarization changer 88 is disposed between the second third mirror surfaces 82, and 84. As the color separating unit 70 shown in FIG. 6, the polarization changer 88 can be disposed on a proceeding path of the color light beams separated by the color separating unit 600, for example, in a part of an exit surface of the color separating unit 600.

FIGS. 17 and 18 show an example in which the color separating unit 600 has four dichroic mirror surfaces. As described above, the number of the dichroic mirror surfaces may vary according to the number of the color light beams to be separated. Also, the number of the polarization changer 88 and the arrangement thereof may vary.

The scrolling unit 700 may include the first and second spiral lens discs 101 and 103 like the scrolling unit 100 described with reference to FIGS. 3, 7, and 8.

In the image display apparatus according to the present preferred embodiment, unlike the above-described preferred embodiments, since the color light beam is not separated into two color light groups and a plurality of color light beams proceed in a signal color light group, the scrolling unit 700, as shown in FIGS. 17 and 18, can have the glass rod 111 only on the proceeding path of the single color light group between the first and second spiral lens discs 101 and 103.

The color light beams separated by the color separating unit 600, for example, four color light beams, are incident on the same effective area of the scrolling unit 700. Here, the effective area of the scrolling unit 700 substantially corresponds to the effective area B of the scrolling unit 100 of FIG. 7.

In the image display apparatus according to a fifth preferred embodiment of the present invention, since a plurality of color light beams proceed in a single color light group, compared to the case shown in FIG. 3, when the optical system is arranged such that the color light beams in the single color light group proceed along the same path as that of the second color light group $L_B$ of FIG. 3, only the cylindrical lenses 97a, 97b, and 132, the fly eye lens array 123, and the relay lens 135, which are arranged on the proceeding path of the light beam of the second color light group $L_B$, are needed while the cylindrical lenses 95a, 95b, and 131, the fly eye lens array 121, and the relay lens 133, which are arranged on the proceeding path of the light beam of the first color light group LA, are not needed.

Also, in the image display apparatus according to the fifth preferred embodiment of the present invention, since a plurality of color light beams proceed in a single color light group, the optical unit to match the optical paths of the two color light groups in the image display apparatuses according to the first through fourth preferred embodiments of the present, invention are not needed.

Since, among the color light beams separated by the color separating unit 600, at least one color light beam and the other color light beams have different polarizations, color light beams having different polarizations are incident on the first and second light valves 157 and 159. The process in which images for the respective colors generated by the first and second light valves 157 and 159 are combined by the image combiner 150 to proceed toward the projection lens unit 270 is substantially the same as that described with reference to FIG. 11.

As described above, when a light beam emitted from the light source is separated by the color separating unit into a plurality of color light beams, and a color illuminating system to make at least one color light beam of the separated color light beams and the other color light beams have different polarizations is applied to the projection type image display apparatus using two light valves, a wide color range representation and a high efficiency projection system can be simultaneously embodied.

In addition to the structures according to the above-described preferred embodiments, the color separating unit according to the present invention, the color illuminating system having the same, and the projection type image display apparatus may have a variety of modifications with a range of a technical concept described in the accompanying claims of the present invention.

According to the present invention, the light beam emitted from the light source is separated by the color separating unit into a plurality of color light beams, at least one color light beam and the other color light beam have different polarizations, and the color light beams are scrolled by the scrolling unit.

Thus, an effective light amount can be increased and a high efficiency color light can be illuminated. Also, by using the spiral lens disc for scroll, the optical configurations of the color illuminating system and the projection type image display apparatus having the same can be simplified so that the entire structure thereof can be made small.

Furthermore, since one group of the color light and the other group of the color light which are separated by the color separating unit into a plurality of color light beams, preferably, four or more color light beams, have different polarizations, two light valves are used and the images generated by the two light valves are combined so that a color image can be projected. Thus, a wide color range can be presented and simultaneously a high efficiency projection type image display apparatus can be embodied.

Also, since images with respect to the respective color light groups are generated by the two light valves and the images are combined to form a color image, a burden of Etendue due to the color separation can be reduced.

It is of course understood that departures can be made from the preferred embodiments of the invention by those of ordinary skill in the art without departing from the spirit and scope of the invention that is limited only by the following claims.

What is claimed is:

1. An image display apparatus comprising:
   at least one light source to generate and radiate a light beam;
   a color separating unit to separate the light beam emitted from the light source into a plurality of color light beams and make at least one of the separated color light beams and the other of said color light beams have different polarizations;
   a plurality of light valves to form an image by controlling at least one of the color light beams separated by the color separating unit and emitted therefrom, in units of pixel according to input image signals; and
   an image combiner to combine images generated by the light valves;
   wherein the color separating unit has a rod type single body structure.

2. The image display apparatus as claimed in claim 1, wherein the color separating unit comprises:
   a plurality of dichroic mirror surfaces which reflect a particular color light only and are inclined with respect to a direction in which the light beam emitted from the light source and wherein said surfaces are separated from each other; and
   at least one polarization changer to make the color light beam and the other color light beams have different polarizations.

3. The image display apparatus as claimed in claim 1, wherein the color separating unit comprises a plurality of dichroic prisms having the dichroic mirror surfaces to reflect different color light beams.

4. The image display apparatus as claimed in claim 2, wherein the polarization changer is disposed between the dichroic mirror surfaces, on or in a part of an exit surface where the separated color light beams exit, or on a proceeding path of at least one of the color light beams separated by the dichroic mirror surfaces.

5. The image display apparatus as claimed in claim 1, wherein the light valves comprise:
   a first light valve forming an image by using at least one color light having one polarization; and
   a second light valve forming an image by using another color light having the other polarization.

6. The image display apparatus as claimed in claim 5, wherein the image combiner comprises a polarizing beam splitter selectively transmitting or reflecting incident color light beams having different polarizations to proceed toward the first and second light valves, and the color light beams are separated according to the polarization thereof and illuminated to the first and second light valves so that combined images are generated by the first and second light valves.

7. The image display apparatus as claimed in claim 6, wherein the image combiner comprises a pair of wave plates disposed between the polarizing beam splitter and the first light valve and between the polarizing beam splitter and the second light valve, to change the polarization of incident light.

8. The image display apparatus as claimed in claim 1, wherein the color separating unit separates the light beam emitted from the light source into three or more color light beams and makes at least one of the separated color light beams and the other color light beams have different polarizations.

9. An image display apparatus comprising:
   at least one light source to generate and radiate a light beam;
   a color separating unit to separate the light beam emitted from the light source into a plurality of color light beams and make at least one of the separated color light beams and the other of said color light beams have different polarizations;
   a plurality of light valves to form an image by controlling at least one of the color light beams separated by the color separating unit and emitted therefrom, in units of pixel according to input image signals; and
   an image combiner to combine images generated by the light valves;
   wherein the color separating unit separates the light beam emitted from the light source into a cyan beam C, a blue beam B, a red beam R, and a green beam G, or a blue beam B, a cyan beam C, a magenta beam M, a red beam R, a green beam G, and a yellow beam Y.

10. The image display apparatus as claimed in claim 1, further comprising a polarization conversion system which is provided at an input end of the color separating unit to align the light beam emitted from the light source in one polarized beam and input it into the color separating unit.

11. An image display apparatus comprising:
at least one light source to generate and radiate a light beam;
a color separating unit to separate the light beam emitted from the light source into a plurality of color light beams and make at least one of the separated color light beams and the other of said color light beams have different polarizations;
a plurality of light valves to form an image by controlling at least one of the color light beams separated by the color separating unit and emitted therefrom, in units of pixel according to input image signals;
an image combiner to combine images generated by the light valves; and
at least one scrolling unit to scroll the color light beams separated by the color separating unit.

12. The image display apparatus as claimed in claim 11, wherein the scrolling unit comprises at least one lens cell formed to convert a rotational motion of said cell to a linear motion of a lens array.

13. The image display apparatus as claimed in claim 12, wherein when at least one of the color light beams separated by the color separating unit is a first color light group and at least the other color light is a second color light group, the color separating unit separates. the first and second color light groups from each other so that the light beams of the first and second color light groups are incident on the scrolling unit by being separated from each other.

14. The image display apparatus as claimed in claim 12, wherein the color separating unit is provided to make the light beams of the first and second color light groups have different polarizations.

15. The image display apparatus as claimed in claim 13, wherein the scrolling unit comprises a single scrolling unit or a pair of scrolling units.

16. The image display apparatus as claimed in claim 14, further comprising an optical block to combine proceeding paths of the light beams of the first and second color light groups passing through the scrolling unit.

17. The image display apparatus as claimed in claim 16, wherein the optical unit comprises:
a first reflection surface to reflect the light beam of one of the first and second color light groups; and
a second reflection surface to selectively transmit and reflect the light beam of one color light group reflected by the first reflection surface and the light beam of the other color light group, so as to combine optical paths of the light beams.

18. The image display apparatus as claimed in claim 16, wherein the optical unit is a scroll changing prism which changes a scroll direction through a process of reflecting a color bar to at least one color light beam passing through one effective area of the scroll unit, and wherein said scroll changing prism selectively transmits and reflects at least one color light incident thereon with a scroll changed in the reflection process and the other color light beam passing through the other effective area of the scrolling unit, and combines the optical paths of the light beams of the first and second color light groups.

19. The image display apparatus as claimed in claim 18, wherein the scroll changing prism has a shape of an Amichi prism.

20. The image display apparatus as claimed in claim 18, wherein the optical unit selectively transmits and reflects at least one color light incident thereon with a scroll changed in the reflection process and the other color light beam passing through the other effective area of the scrolling unit, according to polarization, so as to combine the optical paths of the light beams of the first and second color light groups.

21. The image display apparatus as claimed in claim 12, wherein the color light beams separated by the color separating unit are incident on the same effective area of the scrolling unit.

22. The image display apparatus as claimed in claim 12, wherein at least one lens cell of the scrolling unit is spiral.

23. The image display apparatus as claimed in claim 22, wherein the at least one lens cell of the scrolling unit is a cylindrical lens.

24. The image display apparatus as claimed in claim 12, wherein the scrolling unit is of a disc type.

25. The image display apparatus as claimed in claim 14, wherein the scrolling unit comprises first and second spiral lens discs separated from each other in a direction in which the light beam proceeds and having the lens cell formed on each of the first and second spiral discs.

26. The image display apparatus as claimed in claim 25, further comprising a glass rod provided on the optical path between the first and second spiral lens discs.

27. The image display apparatus as claimed in claim 12, further comprising:
at least one first cylindrical lens disposed on the optical path between the light source and the scrolling unit to control a width of the light beam incident on the scrolling unit; and
at least one second cylindrical lens disposed on the optical path of the light beam passing through the scrolling unit to change the light beam passing through the scrolling unit into a parallel beam.

28. The image display apparatus as claimed in claim 12, further comprising a fly eye lens array disposed on an optical path of the light emitted from the scrolling unit, to make color light beams scrolled by the scrolling unit form color bars in different areas.

29. The image display apparatus as claimed in claim 28, further comprising a relay lens disposed on an optical path of the light beam passing through the fly eye lens array, to have the color bar formed by the fly eye lens array condensed at a predetermined position.

30. The image display apparatus as claimed in claim 12, further comprising a spatial filter disposed between the light source and the color separating unit to adjust a divergent angle of the light beam emitted from the light source.

31. The image display apparatus as claimed in claim 1, further comprising a plurality of relay lenses disposed on optical paths of the color light beams emitted from the color separating unit to make each of the emitted color light beams have a predetermined divergent angle.

32. The image display apparatus as claimed in claim 1, further comprising a spatial filter disposed between the light source and the color separating unit to adjust a divergent angle of the light beam emitted from the light source.

* * * * *